(12) United States Patent
Wifvesson

(10) Patent No.: US 11,818,569 B2
(45) Date of Patent: Nov. 14, 2023

(54) METHODS SUPPORTING AUTHENTICATION IN WIRELESS COMMUNICATION NETWORKS AND RELATED NETWORK NODES AND WIRELESS TERMINALS

(71) Applicant: Telefonaktiebolaget LM Ericsson (publ), Stockholm (SE)

(72) Inventor: Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 464 days.

(21) Appl. No.: 16/346,012

(22) PCT Filed: Oct. 10, 2017

(86) PCT No.: PCT/EP2017/075727
§ 371 (c)(1),
(2) Date: Apr. 29, 2019

(87) PCT Pub. No.: WO2018/077607
PCT Pub. Date: May 3, 2018

(65) Prior Publication Data
US 2020/0059783 A1 Feb. 20, 2020

Related U.S. Application Data

(60) Provisional application No. 62/414,896, filed on Oct. 31, 2016.

(51) Int. Cl.
*H04W 12/041* (2021.01)
*H04W 8/08* (2009.01)
(Continued)

(52) U.S. Cl.
CPC ........... *H04W 12/041* (2021.01); *H04L 63/08* (2013.01); *H04L 63/162* (2013.01); *H04W 8/08* (2013.01);
(Continued)

(58) Field of Classification Search
CPC . H04W 12/041; H04W 12/0433; H04W 8/08; H04W 12/06; H04W 36/0038;
(Continued)

(56) References Cited

U.S. PATENT DOCUMENTS

2009/0265543 A1* 10/2009 Khetawat .............. H04W 12/08
713/151
2013/0117820 A1* 5/2013 Cherian .................. H04L 63/08
726/4
(Continued)

FOREIGN PATENT DOCUMENTS

| CN | 101599878 A | 12/2009 |
| CN | 101695165 A | 4/2010 |

(Continued)

OTHER PUBLICATIONS

3rd Generation Partnership Project; Technical Specification Group Services and System Aspects; Study on the security aspects of the next generation system (Release 14), V0.5.0 (Oct. 2016) (Year: 2016).*

(Continued)

*Primary Examiner* — Daniel B Potratz
(74) *Attorney, Agent, or Firm* — Rothwell, Figg, Ernst & Manbeck, P.C.

(57) ABSTRACT

Some methods in a wireless communication network may include providing a first authentication key, and deriving a second authentication key based on the first authentication key, with the second authentication key being associated with the wireless terminal. Responsive to deriving the sec- (Continued)

ond authentication key, a key response message may be transmitted including the second authentication key and/or an EAP-Finish/Re-auth message. Some other methods in a wireless communication network may include receiving a key response message including a core network mobility management authentication key and an EAP-Finish/Re-auth message. Responsive to receiving the key response message, the network may initiate transmission of an EAP-Finish/Re-auth message and/or a freshness parameter used to derive the core network mobility management authentication key from the wireless communication network to the wireless terminal responsive to the key response message. Related wireless terminal methods are also discussed.

12 Claims, 21 Drawing Sheets

(51) Int. Cl.
*H04L 9/40* (2022.01)
*H04W 12/06* (2021.01)
*H04W 36/00* (2009.01)
*H04W 12/0433* (2021.01)

(52) U.S. Cl.
CPC ....... *H04W 12/0433* (2021.01); *H04W 12/06* (2013.01); *H04W 36/0038* (2013.01)

(58) Field of Classification Search
CPC .... H04W 12/062; H04W 12/04; H04L 63/08; H04L 63/162
See application file for complete search history.

(56) References Cited

U.S. PATENT DOCUMENTS

| | | | |
|---|---|---|---|
| 2013/0263223 A1 | 10/2013 | Cherian et al. | |
| 2014/0164763 A1* | 6/2014 | Cherian | H04L 9/0869 713/155 |
| 2015/0016416 A1* | 1/2015 | Hawkes | H04W 36/0016 370/331 |
| 2015/0350907 A1* | 12/2015 | Timariu | H04W 12/062 726/6 |
| 2018/0220364 A1* | 8/2018 | Li | H04W 36/0038 |
| 2019/0182789 A1* | 6/2019 | Kim | H04W 8/08 |

FOREIGN PATENT DOCUMENTS

| | | |
|---|---|---|
| CN | 103797831 A | 5/2014 |
| CN | 103797832 A | 5/2014 |
| CN | 104662861 A | 5/2015 |
| WO | 2010/109040 A1 | 9/2010 |

OTHER PUBLICATIONS

International Search Report and Written Opinion dated Nov. 29, 2017 issued in International Application No. PCT/EP2017/075727. (12 pages).
3GPP TR 33.899 V0.5.0 (Oct. 2016); Technical Report; 3rd Generation Partnership Project; Technical Specification Group Services and System Aspects; Study on the security aspects of the next generation system (Release 14), Oct. 2016. (244 pages).
3GPP2 X.P0054-100 Version 2; "Basic IP Service for Converged Access Network Specification", 3rd Generation Partnership Project 2., Jun. 30, 2013. (68 pages).
Cao, Z. et al., EAP Re-Authentication Protocol Extensions for Authenticated Anticipatory Keying (ERP/AAK), Network Working Group, Mar. 14, 2011. (15 pages).
Cao, Z. et al., "EAP Extensions for the EAP Re-authentication Protocol (ERP)", Internet Engineering Task Force (IETF) (Request for Comments (RFC) 6696), Jul. 2012. (47 pages).
3GPP TR 23.799 V0.8.0 (Sep. 2016), Sep. 2016 (423 pages).
3GPP TR 33.821 V9.0.0 (Jun. 2009), Jun. 2009 (141 pages).

* cited by examiner

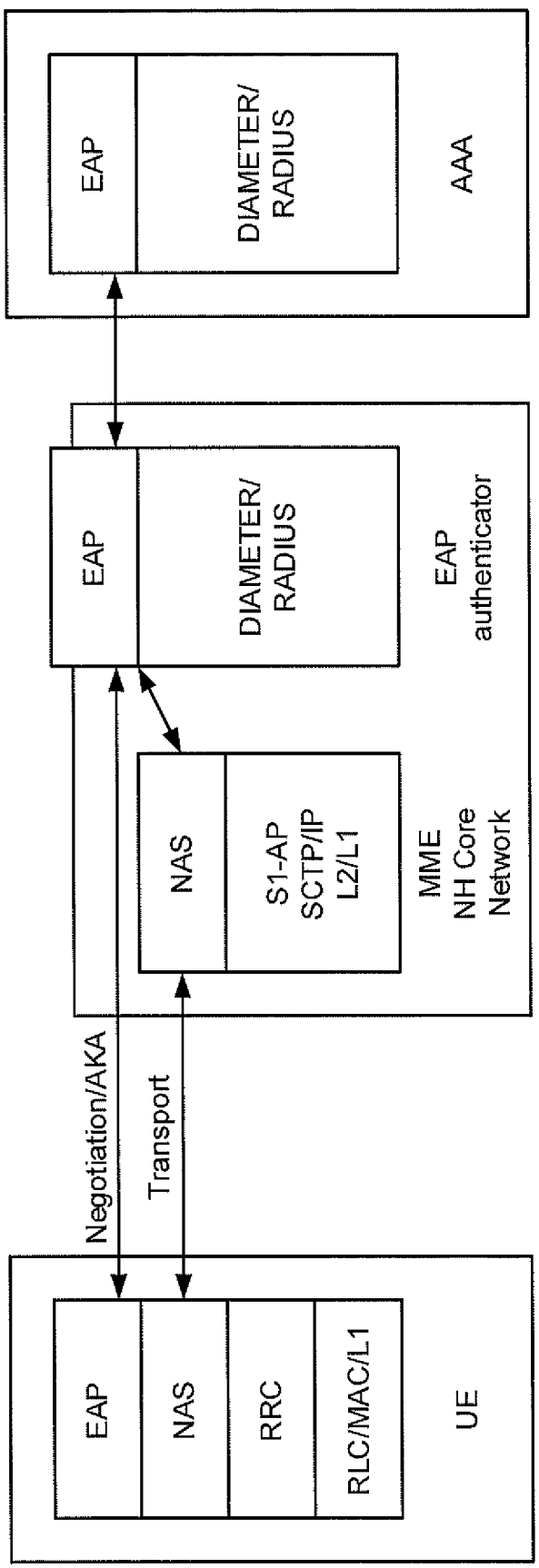

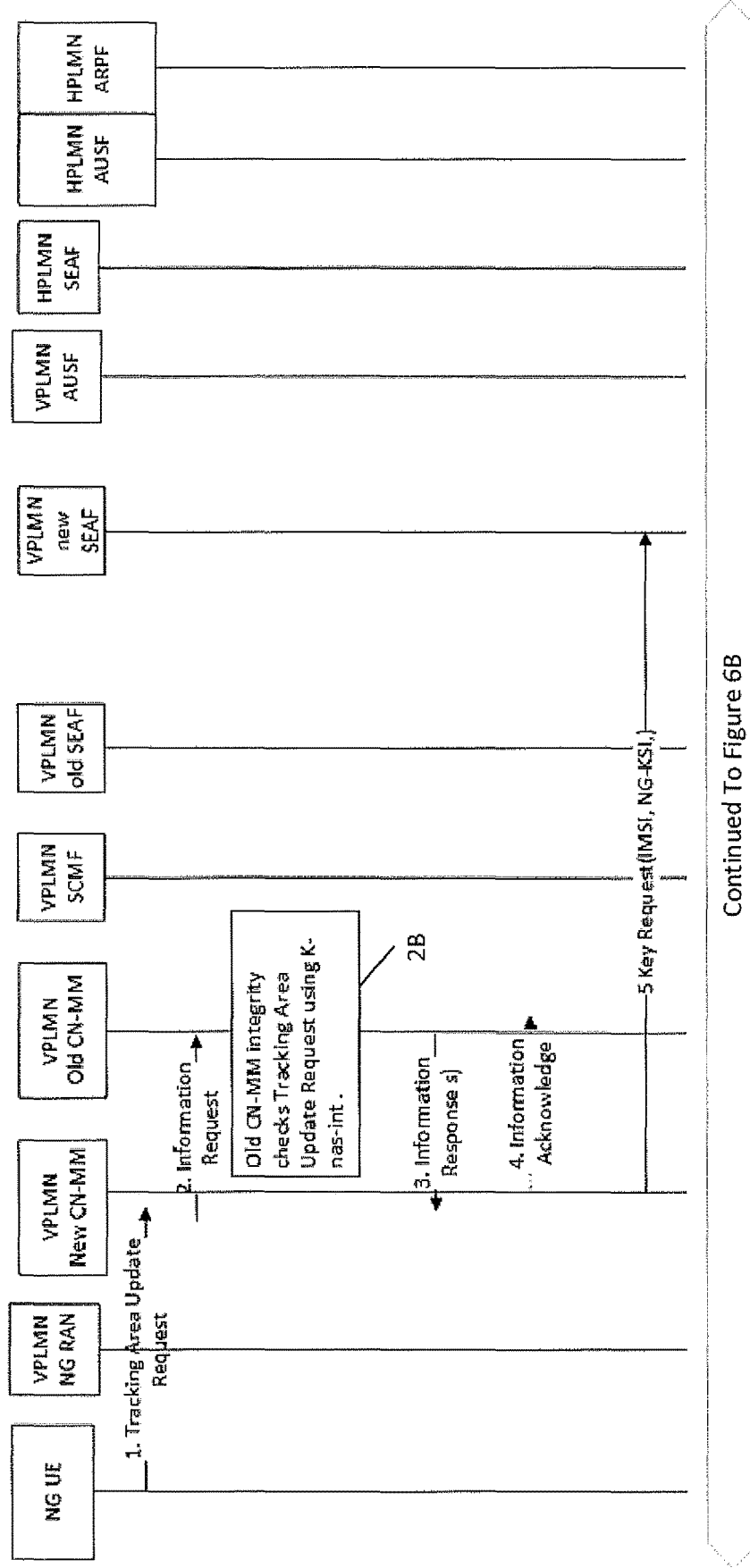

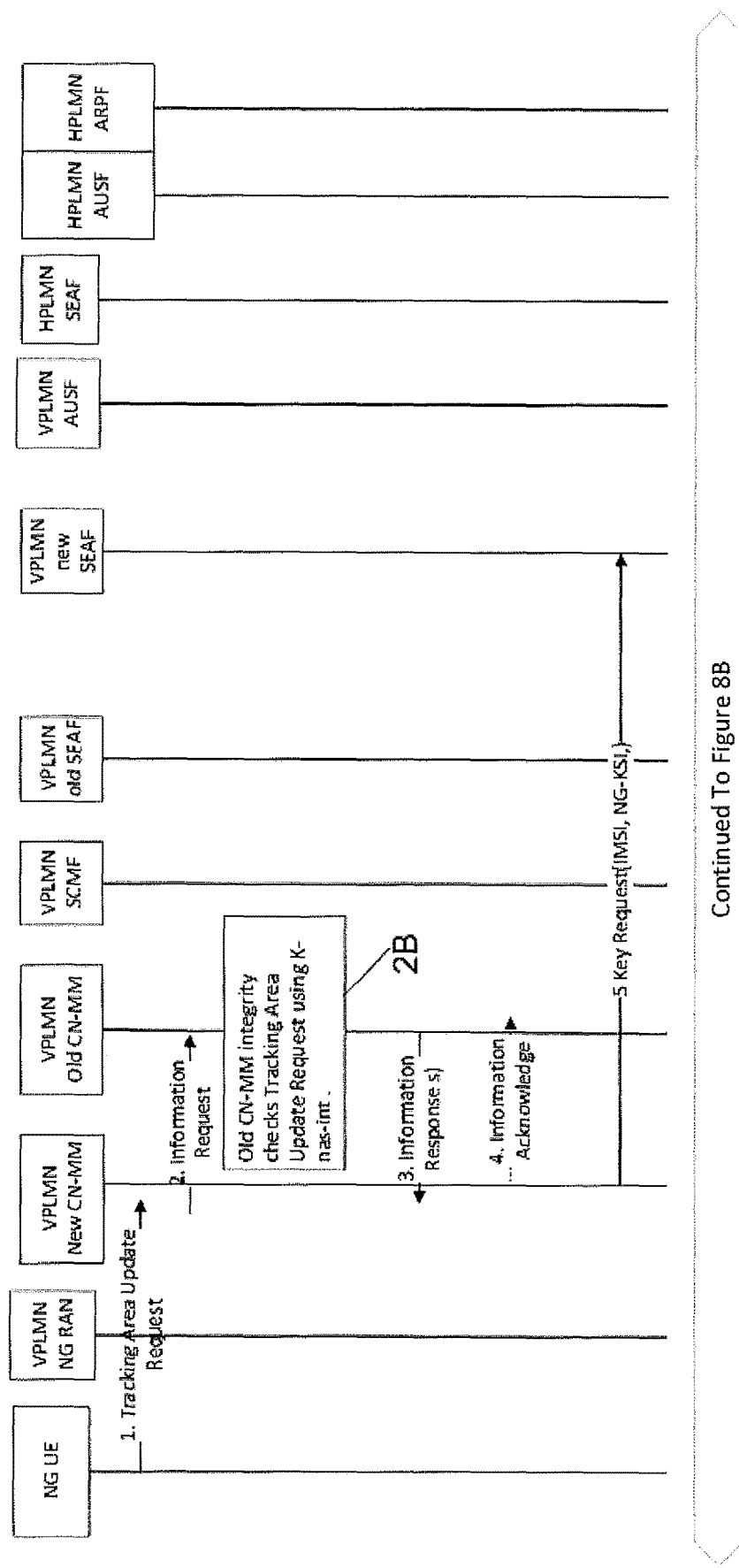

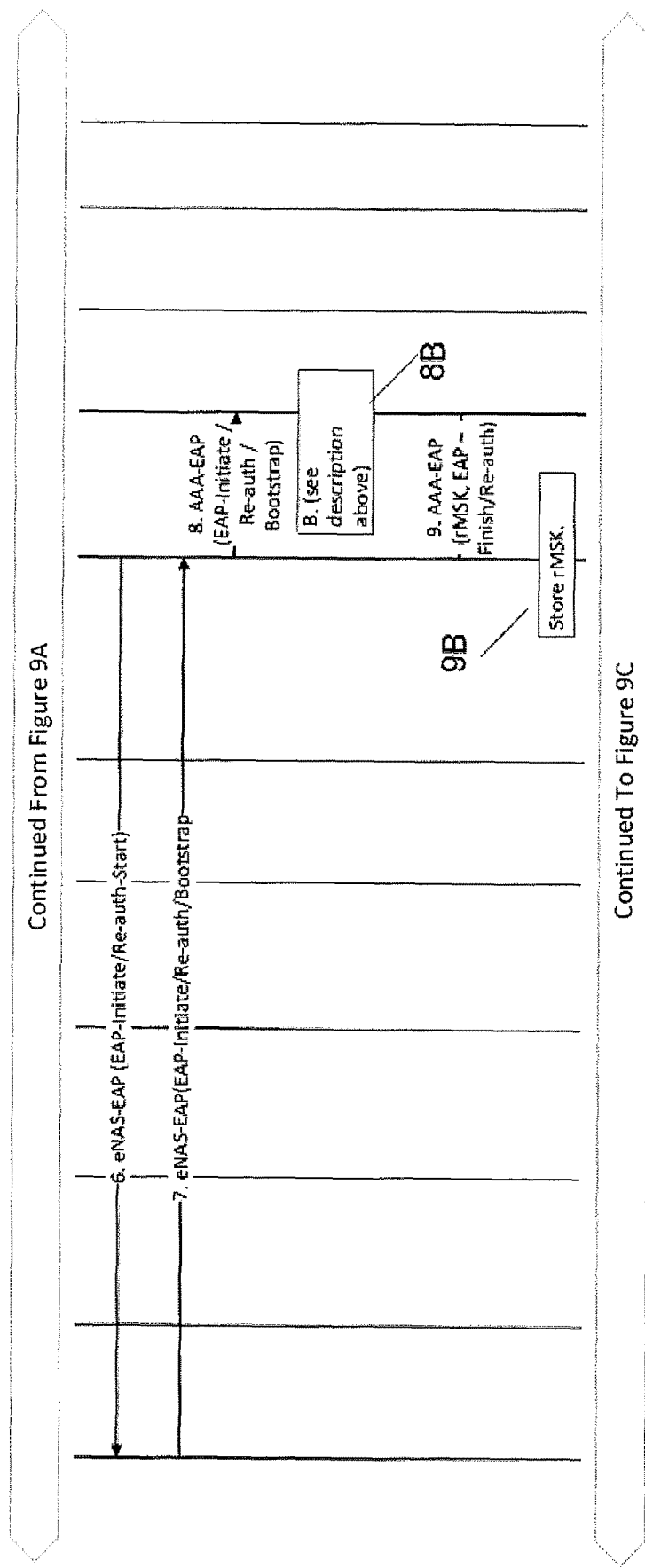

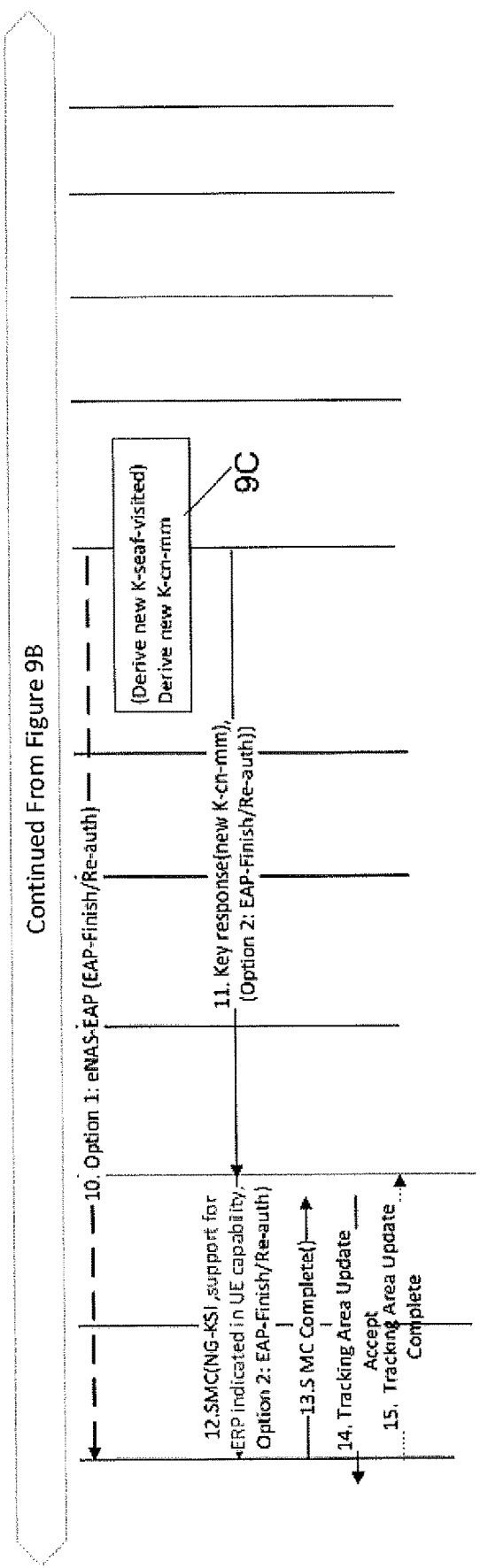

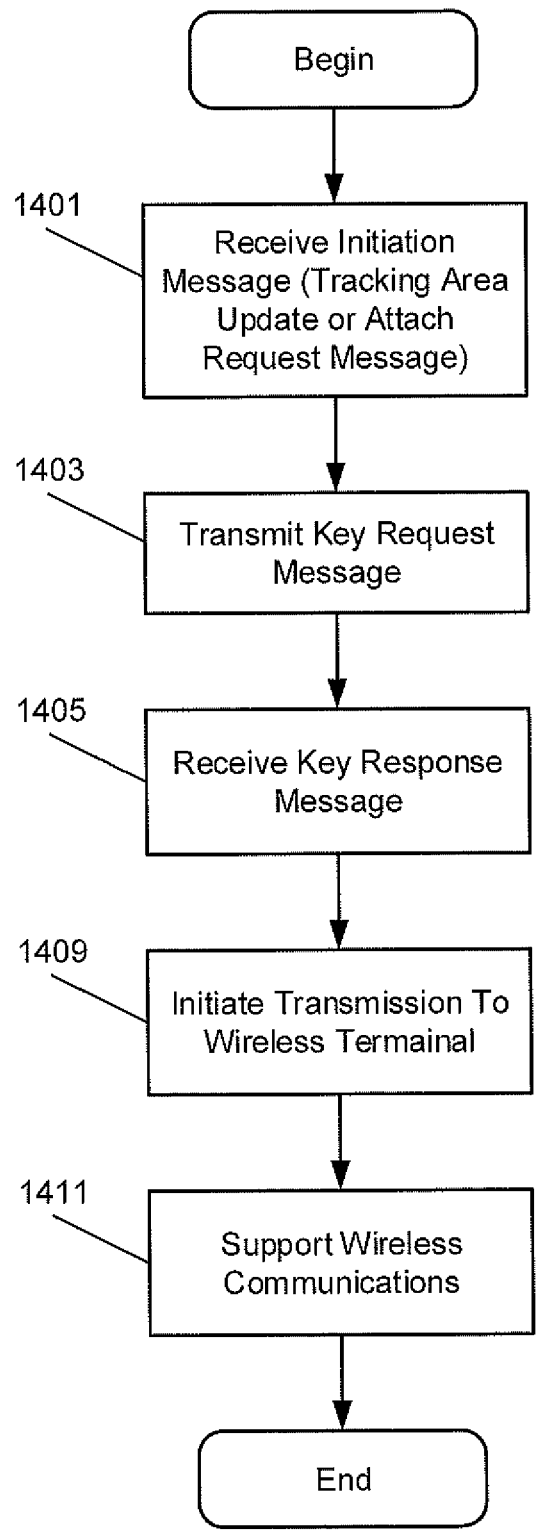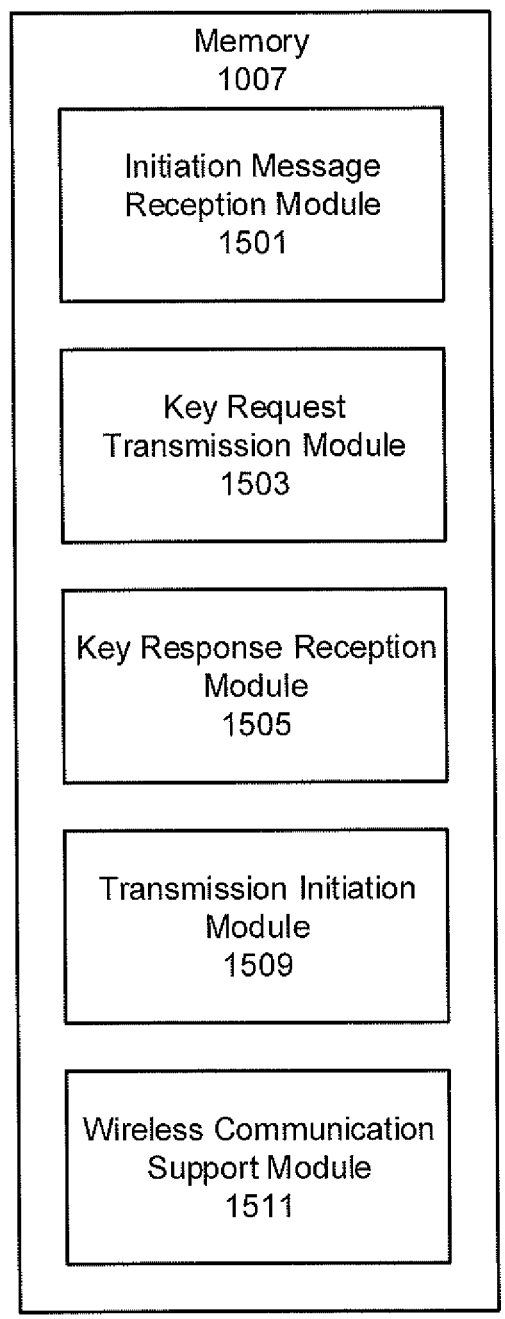

METHODS SUPPORTING AUTHENTICATION IN WIRELESS COMMUNICATION NETWORKS AND RELATED NETWORK NODES AND WIRELESS TERMINALS

CROSS REFERENCE TO RELATED APPLICATION(S)

This application is a 35 U.S.C. § 371 National Stage of International Patent Application No. PCT/EP2017/075727, filed Oct. 10, 2017, designating the United States and claiming priority to U.S. provisional application No. 62/414, 896, filed on Oct. 31, 2016. The above identified applications are incorporated by reference.

TECHNICAL FIELD

The present disclosure relates generally to communications, and more particularly to wireless communications and related methods, network nodes, and wireless terminals.

BACKGROUND

3GPP is exploring opportunities to use the EAP authentication framework as a unified authentication method for Next Generation (referred to as 5G or $5^{th}$ generation).

A potential Next Generation architecture could be provided according to TR 23.799 [reference 1] as shown in FIG. 1.

A number of security functions have also been defined in 3GPP SA3 TR 33.899 [reference 2], including:
  ARPF; The ARPF stores UE'S profile and the security related information of the UE.
  The ARPF interacts with the AUSF.
  AUSF; An authentication function that interacts with the ARPF and terminates requests from the SEAF. The AUSF shall reside in a secure environment in an operator's network or a 3rd party system, which is not exposed to unauthorized physical access.
  SEAF; An authentication function in the core network that interacts with the AUSF and the NG-UE and receives from the AUSF the intermediate key that was established as a result of the NG-UE authentication process. The SEAF also interacts with the Mobility Management (MM) function, e.g. during initial Attach, and with the SCMF. The SEAF shall reside in a secure environment in an operator's network, which is not exposed to unauthorized physical access. In the roaming case, an SEAF resides in the visited network. The intermediate key sent to the SEAF in the visited network shall be specific to the visited network.
  SCMF; The SCMF receives a key from the SEAF that it uses to derive further (e.g., access-network specific) keys.

These security functions have been mapped to the architecture in FIG. 1.

A proposed key hierarchy in SA3 TR 33.899 [reference 2] could be provided as shown in FIG. 2. The 3GPP SA3 study in TR 33.899 [reference 2] is studying how to integrate EAP to 3GPP protocols.

A current practice of integrating EAP to 3GPP protocols may be part of the MulteFire Neutral Host Protocol proposal shown in FIG. 3. NAS protocol is used to transport EAP packets transparently on top of NAS. FIG. 3 illustrates the MulteFire Neutral Host Protocol Stack for EAP authentication.

At a protocol level, the MulteFire solution reuses procedures described in TS 33.402 for non-3GPP accesses (e.g., trusted or untrusted WLAN access). FIGS. 4A-C illustrate use of EAP-AKA with MulteFire. More particularly, FIGS. 4A-C illustrate the MulteFire Neutral Host Protocol Stack for EAP authentication (re-using a procedure described in TS 33.402).

An argument against use of the EAP-AKA and the EAP framework when evaluated in TR 33.821 [reference 3] was related to handovers and idle mode mobility. It was considered that transfer of keying material without re-authentication was contradictory to the EAP keying framework. EAP keying material was not allowed to be transported to another entity (i.e., between MMEs). One reason for splitting the security context and key management functionality outside the CN-MM entity could be to allow faster re-authentication in such scenarios.

Earlier work focused on evaluating EAP-AKA only, and considered the method specific fast re-authentication as one option to improve/optimize the procedure. There has been further progress in IETF on an EAP method independent framework for re-authentication that should be further analyzed from a Next Generation point of view. RFC 6696 [reference 4] specifies the EAP extension for EAP re-authentication protocol (ERP). ERP is common for all EAP based authentication methods and can be used for efficient re-authentication between the peer and EAP re-authentication server. The re-authentication server may locate in the visited network.

ERP could be used in NextGen systems to provide faster re-authentication, for example, if/when the security endpoint (i.e., CN-MM) in the network side is changing. In FIG. 5, the SCKM is decoupled from the CN-MM. FIG. 5 illustrates re-authentication using ERP. Current proposals for future use, however, may be inefficient.

The approaches described above could be pursued, but are not necessarily approaches that have been previously conceived or pursued. Therefore, unless otherwise indicated herein, the approaches described above are not prior art to embodiments in this application and are not admitted to be prior art by inclusion above.

SUMMARY

According to some embodiments of inventive concepts, a method may be provided in a wireless communication network supporting communications with a wireless terminal. The method may include providing a first authentication key and deriving a second authentication key based on the first authentication key. The second authentication key may be associated with the wireless terminal. Responsive to deriving the second authentication key, a key response message including the second authentication key and/or an Extensible Authentication Protocol Finish/Re-authentication (EAP-Finish/Re-auth) message may be transmitted.

According to some other embodiments of inventive concepts, a method may be provided in a wireless communication network supporting communications with a wireless terminal. The method may include receiving a key response message including a core network mobility management authentication key and an Extensible Authentication Protocol Finish/Re-authentication (EAP-Finish/Re-auth) message. Responsive to receiving the key response message, transmission of an EAP-Finish/Re-auth message and/or a freshness parameter used to derive the core network mobility management authentication key from the wireless communication network to the wireless terminal may be initiated responsive to the key response message.

According to still other embodiments of inventive concepts, a method may be provided to operate a wireless terminal configured to provide communication using a wireless communication network. The method may include receiving a Security Mode Command (SMC) message from the wireless communication network. Moreover, the SMC message may include an Extensible Authentication Protocol Finish/Re-authentication (EAP-Finish/Re-auth) message and/or a freshness parameter used to derive a core network mobility management authentication key.

According to yet other embodiments of inventive concepts, a node of a wireless communication network may support communications with a wireless terminal. In particular, the node may be adapted to provide a first authentication key, and derive a second authentication key based on the first authentication key, with the second authentication key being associated with the wireless terminal. The node may also be adapted to transmit a key response message including the second authentication key and/or an Extensible Authentication Protocol Finish/Re-authentication (EAP-Finish/Re-auth) message responsive to deriving the second authentication key.

According to more embodiments of inventive concepts, a node of a wireless communication network may support communications with a wireless terminal. The node may be adapted to receive a key response message including a core network mobility management authentication key and an Extensible Authentication Protocol Finish/Re-authentication (EAP-Finish/Re-auth) message. The node may also be configured to initiate transmission of an EAP-Finish/Re-auth message and/or a freshness parameter used to derive the core network mobility management authentication key from the wireless communication network to the wireless terminal responsive to the key response message, with the transmission being initiated responsive to receiving the key response message.

According to still more embodiments of inventive concepts, a wireless terminal may be configured to provide communication using a wireless communication network. The wireless terminal may be adapted to receive a Security Mode Command (SMC) message from the wireless communication network, and the SMC message may include an Extensible Authentication Protocol Finish/Re-authentication (EAP-Finish/Re-auth) message and/or a freshness parameter used to derive a core network mobility management authentication key.

According to yet more embodiments of inventive concepts, a node of a wireless communication network may include a network interface adapted to provide communication with other nodes of the wireless communication network, and a processor coupled to the network interface. The processor may be configured to transmit and/or receive communications through the network interface. The processor may be further configured to provide a first authentication key, and to derive a second authentication key based on the first authentication key, with the second authentication key being associated with the wireless terminal. The processor may be further configured to transmit a key response message including the second authentication key and/or an Extensible Authentication Protocol Finish/Re-authentication (EAP-Finish/Re-auth) message responsive to deriving the second authentication key.

According to further embodiments of inventive concepts, a node of a wireless communication network may include a network interface adapted to provide communication with other nodes of the wireless communication network and a processor coupled to the network interface. The processor may be configured to transmit and/or receive communications through the network interface. In addition, the processor may be configured to receive a key response message including a core network mobility management authentication key and an Extensible Authentication Protocol Finish/Re-authentication (EAP-Finish/Re-auth) message. The processor may also be configured to initiate transmission of an EAP-Finish/Re-auth message and/or a freshness parameter used to derive the core network mobility management authentication key from the wireless communication network to the wireless terminal responsive to the key response message, with the transmission being initiated responsive to receiving the key response message.

According to yet further embodiments of inventive concepts, a wireless terminal may be configured to provide communication using a wireless communication network. The wireless terminal may include a wireless communication interface adapted to provide communication over a radio interface with the wireless communication network, and a processor coupled to the wireless communication interface. The processor may be configured to transmit and/or receive communications through the wireless communication interface. In addition, the processor may be configured to receive a Security Mode Command (SMC) message from the wireless communication network, with the SMC message including an Extensible Authentication Protocol Finish/Re-authentication (EAP-Finish/Re-auth) message and/or a freshness parameter used to derive a core network mobility management authentication key.

According to some embodiments disclosed herein, performance may be improved in terms of network messaging roundtrips and/or delay, and/or in terms of energy consumption.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a diagram illustrating a MulteFire neutral host protocol stack for EAP authentication;

FIGS. 6A, 6B, and 6C provide a message diagram illustrating re-authentication according to some embodiments of inventive concepts;

FIGS. 8A, 8B, and 8C provide a message diagram illustrating re-authentication using a freshness parameter according to some embodiments of inventive concepts;

FIGS. 9A-C provide a message diagram illustrating re-authentication using a UE capability indication to support ERP according to some embodiments of inventive concepts;

FIG. 14 is a flow chart illustrating operations of a network node of FIG. 10 and FIG. 15 is a block diagram illustrating related modules according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a wireless communication network that provides communications over radio communication channels with wireless terminals (also referred to as UEs). It will be understood, however, that inventive concepts are not limited to such embodiments and may be embodied generally in any type of communication network. As used herein, a wireless terminal (also referred to as a UE, user equipment node, mobile terminal, wireless communication device, etc.) can include any device that receives data from and/or transmits data to a communication network, and may include, but is not limited to, a mobile telephone ("cellular" telephone), laptop/portable computer, pocket computer, hand-held computer, and/or desktop computer.

Also, note that terminology such as a network node, network server, base station (also referred to as a eNodeB, eNB, etc.) and wireless terminal should be considered non-limiting and does not imply a certain hierarchical relation between such elements. In general, a network node could be considered as a first device and a wireless terminal or "UE" could be considered as a second device, and these two devices may communicate with each other over some radio channel.

Figure 10:
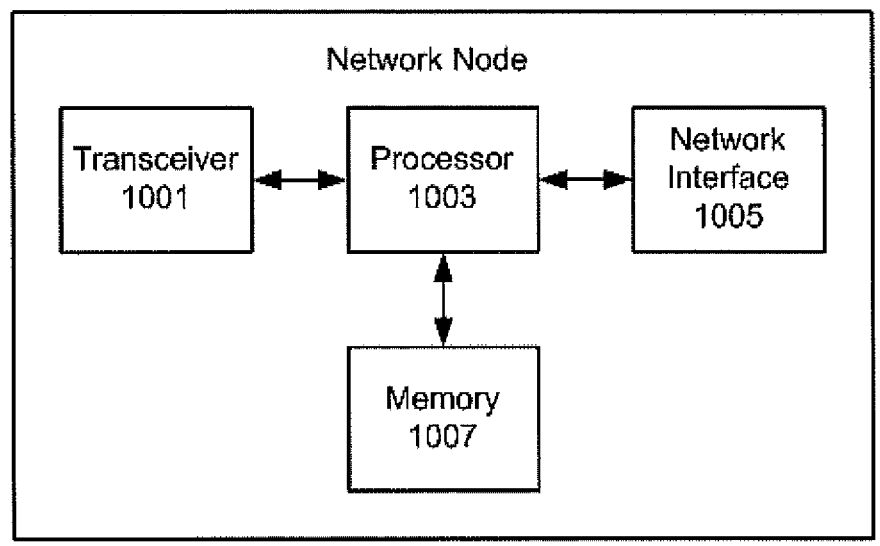
FIG. 10 is a block diagram illustrating a network node according to some embodiments of inventive concepts.

FIG. 10 is a block diagram illustrating elements of a network node (also referred to as a network server) according to some embodiments of inventive concepts. As shown, a network node may include a network interface circuit 1005 (also referred to as a network interface) configured to provide communications with other network nodes, and a processor circuit 1003 (also referred to as a processor) coupled to the network interface circuit, and a memory circuit 1007 coupled to the processor circuit. The memory circuit 1007 may include computer readable program code/modules that when executed by the processor circuit 1003 causes the processor circuit to perform operations according to embodiments disclosed herein. According to other embodiments, processor circuit 1003 may be defined to include memory so that a memory circuit is not separately provided. The network node may also include a transceiver circuit 1001 (also referred to as a transceiver) configured to provide radio communications with a plurality of wireless terminals, and such a transceiver may be coupled to processor 1003. For example, the network node of claim 10 may be configured to operate as a CN-MM server and/or an SEAF server as discussed below with respect to FIGS. 6, 8, and/or 9.

Figure 11:
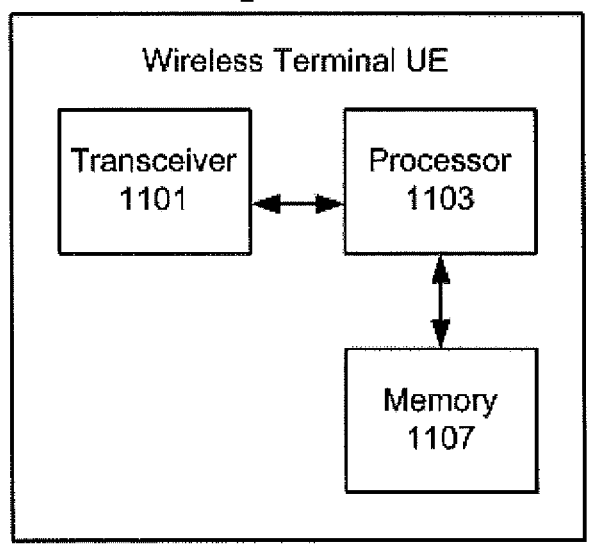
FIG. 11 is a block diagram illustrating a wireless terminal (UE) according to some embodiments of inventive concepts.

FIG. 11 is a block diagram illustrating elements of a wireless terminal UE (also referred to as a mobile terminal, mobile station, a UE, a user equipment, a user equipment node, wireless device, wireless communication device, etc.). As shown, a wireless terminal UE may include a transceiver circuit 1101 (also referred to as a transceiver) configured to provide radio communications with a wireless communication network, a processor circuit 1103 (also referred to as a processor) coupled to the transceiver circuit, and a memory circuit 1107 coupled to the processor circuit. The memory circuit 1107 may include computer readable program code that when executed by the processor circuit 1103 causes the processor circuit to perform operations according to embodiments disclosed herein. According to other embodiments, processor circuit 303 may be defined to include memory so that a memory circuit is not separately provided. For example, the wireless terminal of FIG. 11 may be configured to operate as a UE as discussed below with respect to FIGS. 6, 8, and/or 9.

A problem of directly re-using ERP protocol in 3GPP 5G/NextGen may be that the NAS protocol and EAP framework include overlapping functionality. A solution may be sub-optimal in terms of a number of roundtrips that may be needed to complete fast authentication using ERP protocol. This may mean that identical or otherwise overlapping messages may be used over the air-interface.

A problematic message in EAP and ERP may be the Extensible Authentication Protocol Finish/Re-authentication (EAP-Finish/Re-auth) message described in RFC 6696 [reference 4], the disclosure of which is incorporated herein in its entirety by reference. The EAP-Finish/Re-auth message is part of the ERP protocol defined in RFC6696, and the EAP-Finish/Re-auth message is sent by the home ER (RFC6696) which may correspond to an AUSF server either in visited PLMN (Public Land Mobile Network) or in home PLMN in a 5G architecture as a response to a received EAP-Initiate/Re-auth message from a peer (UE) which is successfully verified and considered as a valid message by the home ER which corresponds to an AUSF server either in visited PLMN (VPLMN) or in home PLMN in 5G architecture.

This message may have overlapping functionality with the legacy NAS protocol message NAS Security Mode Command (SMC). If an EAP-Finish/Re-auth messages is carried transparently in NAS protocol, and NAS is not aware of it, then the overlapping functionality may remain, and the fast re-authentication procedure may remain inefficient.

Figure 1:
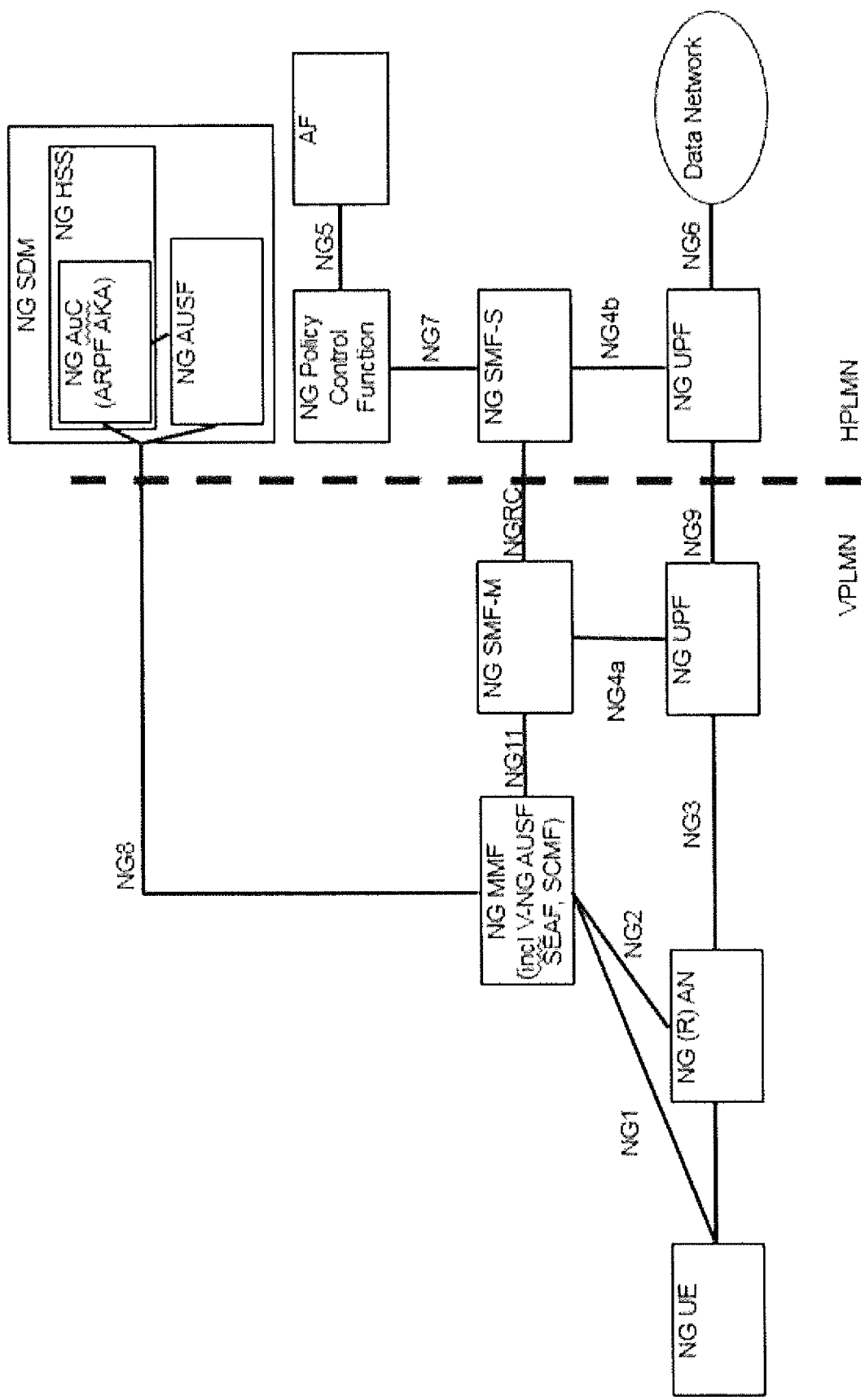
FIG. 1 is block diagram illustrating a potential next generation communication architecture.
Figure 2:
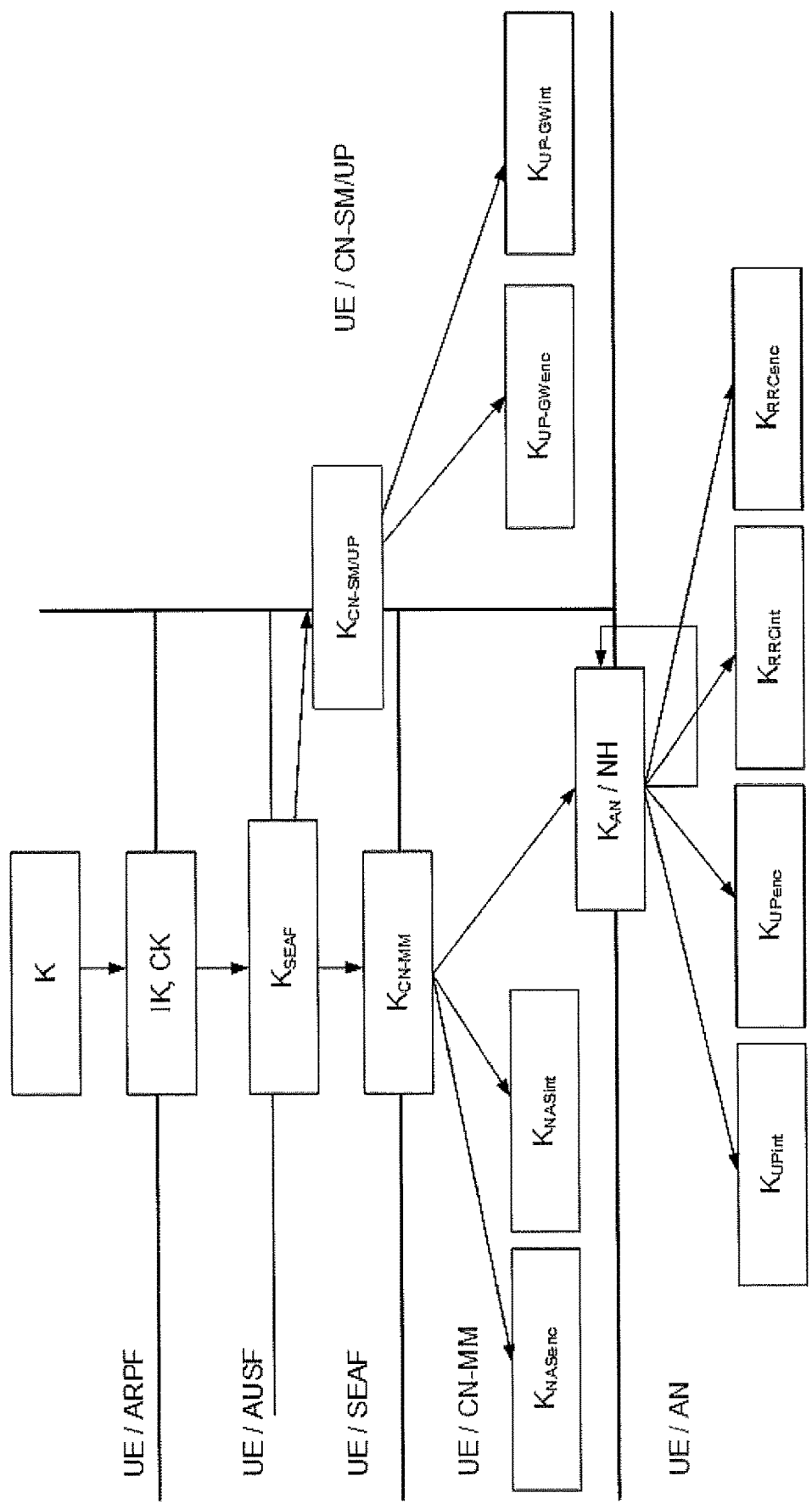
FIG. 2 is a block diagram illustrating a potential key hierarchy proposed in SA3 TR 33.899.
Figure 4A:
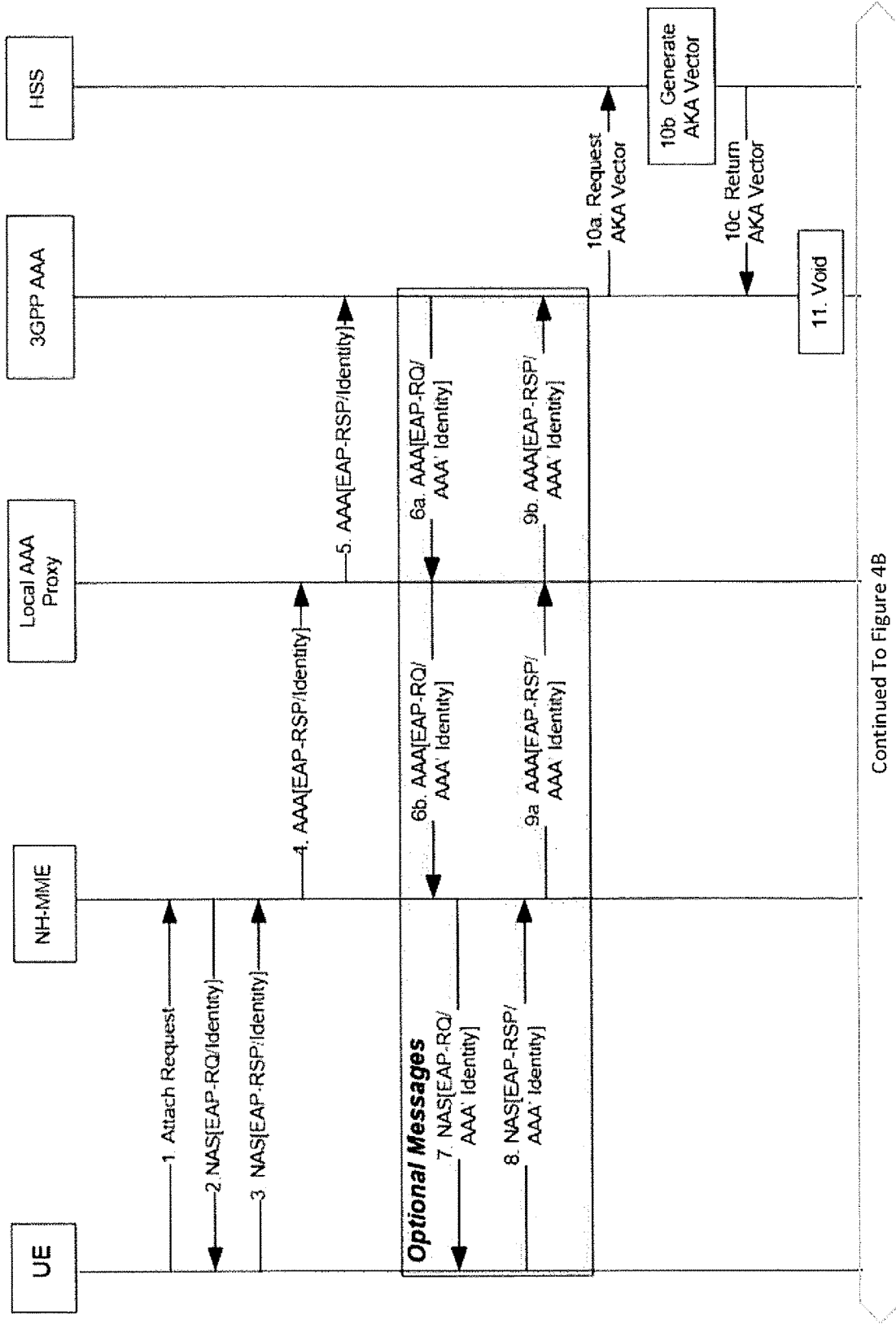
FIGS. 4A, 4B, and 4C provide a message diagram illustrating a MulteFire neutral host protocol stack for EAP authentication (re-using a procedure described in TS 33.402)
Figure 4B:
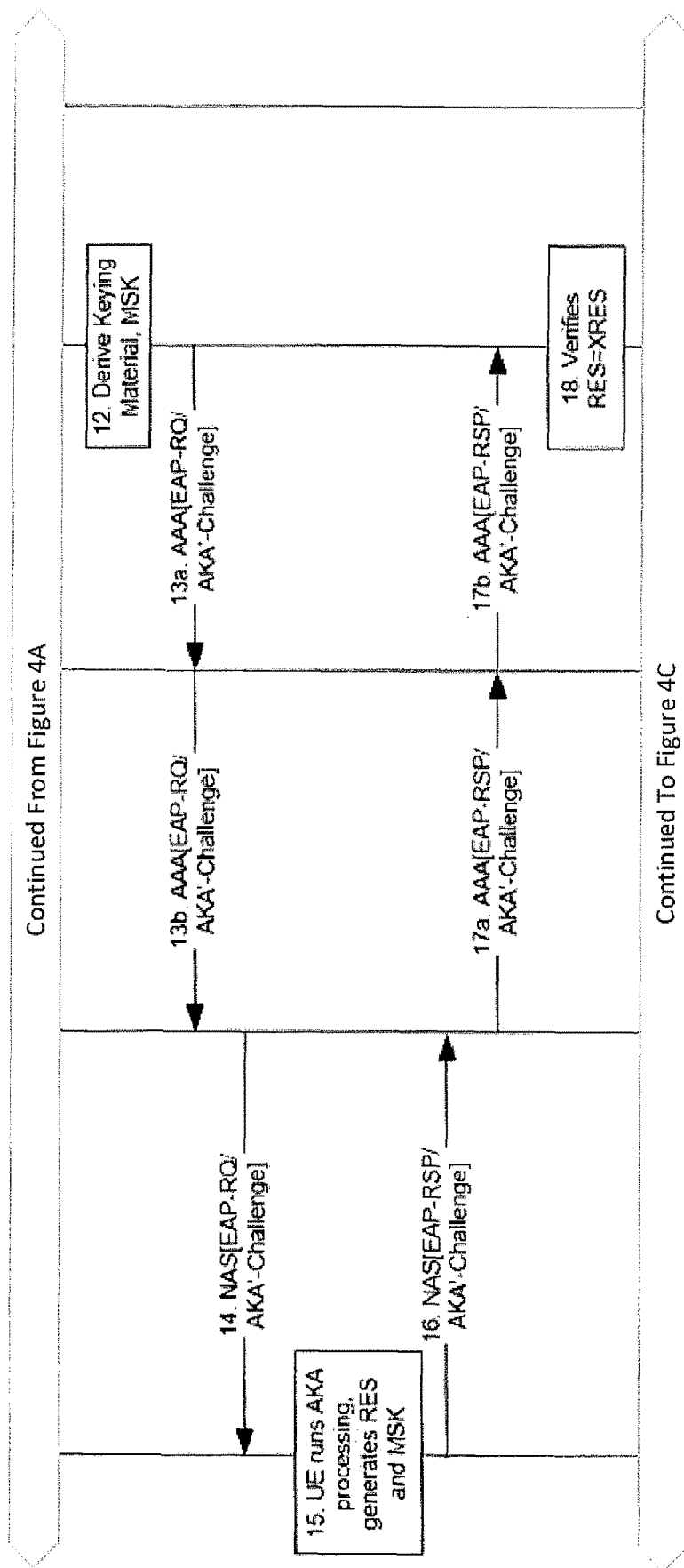
Figure 4C:
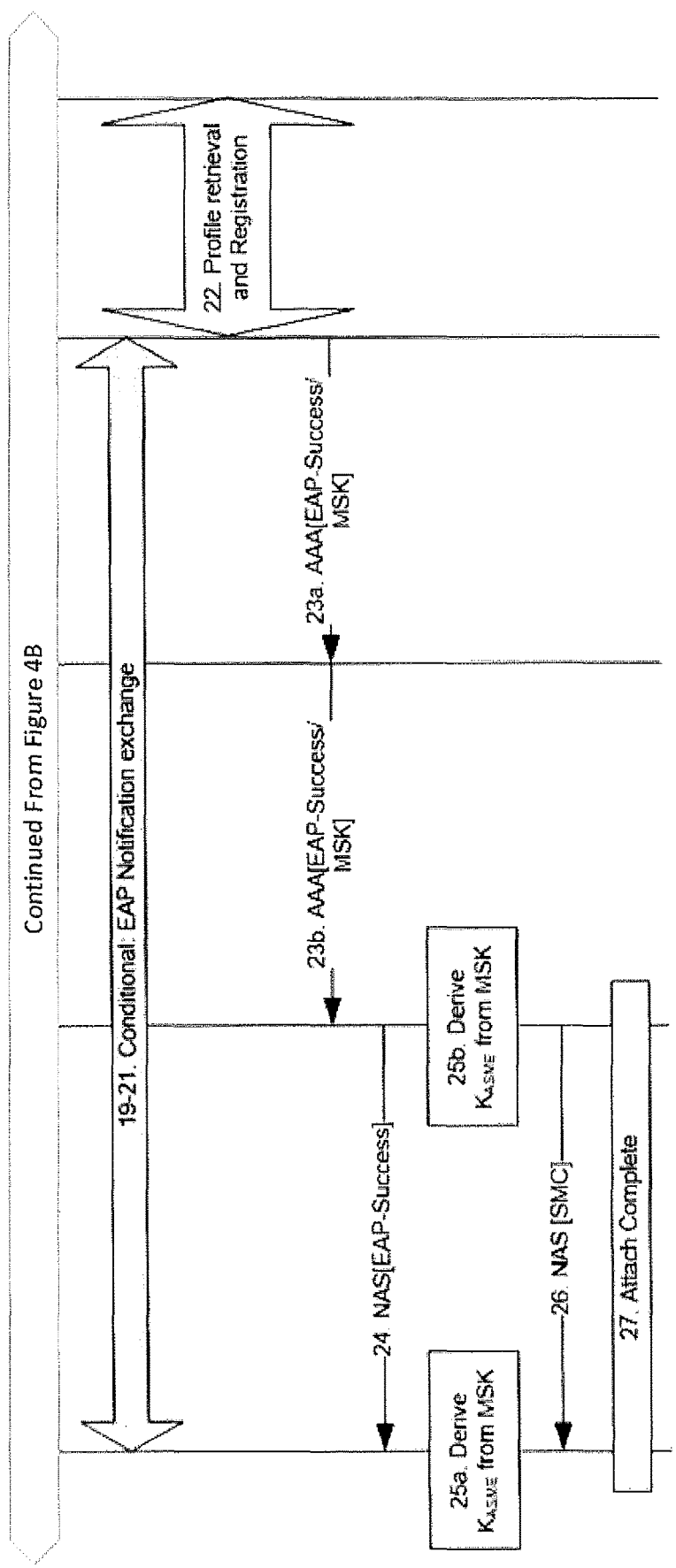
Figure 5:
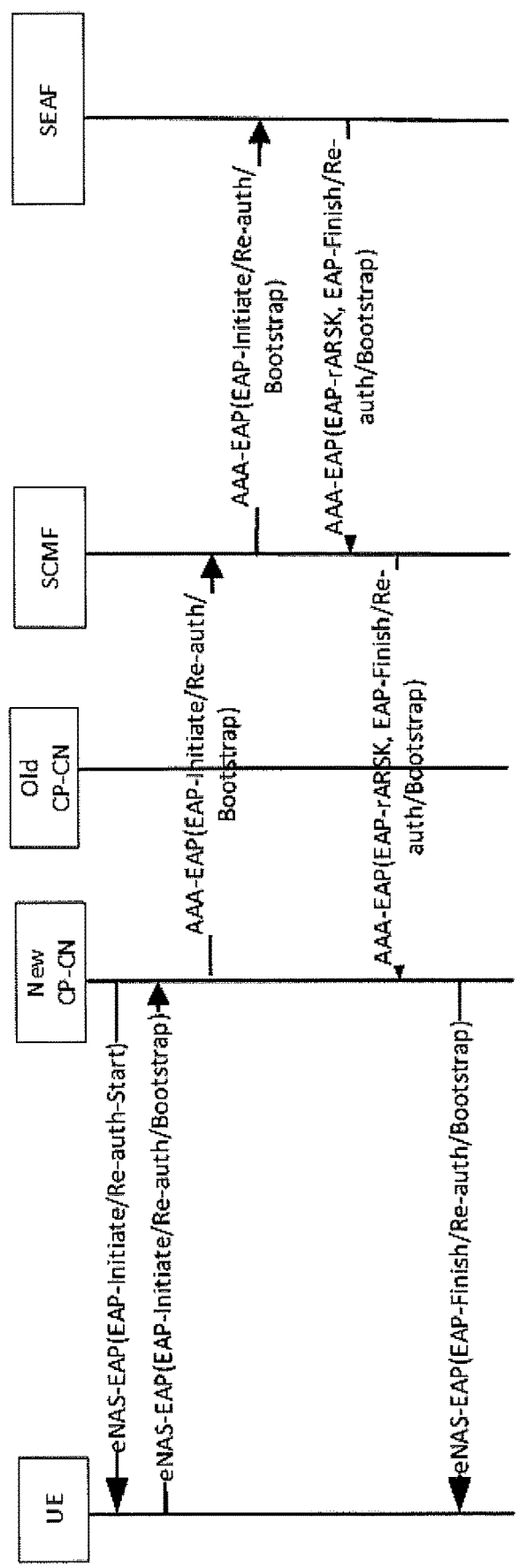
FIG. 5 is a message diagram illustrating re-authentication using ERP.

Another problem may be that the SEAF (e.g., an SEAF server) will receive a key from the AUSF (e.g., an AUSF server). The SCMF or SEAF may need to derive a further key (i.e., the K-CN-MM key in FIG. 2) from the K-SEAF key according to the key hierarchy and the definitions of security function in SA3 TR 33.899 [reference 2]. A freshness parameter may be needed as input to derive the K-CN-MM key from the K-SEAF key. This freshness parameter may need to be transported to the UE as well so that the UE can perform the same key derivation as the SCMF or SEAF. It is not specified how this freshness parameter is transported to the UE. This freshness parameter is referred as the 'second freshness parameter' in the following detailed description.

Overlapping behavior between EAP-Finish/Re-auth message and NAS Security Mode Command message may be reduced/removed by sending them together. NAS protocol thus becomes EAP aware on this message.

A further key (i.e., the K-CN-MM key in FIG. 2) may need to be derived from the K-SEAF key in SCMF or SEAF. A freshness parameter may be needed as input to derive the K-CN-MM key from the K-SEAF key. This freshness parameter may need to be transported to the UE as well. It is not specified how this freshness parameter is transported to the UE. This freshness parameter is referred as the 'second freshness parameter' in the following detailed description.

To improve/optimize overlapping behavior between EAP-ERP protocol and NAS protocol, the UE could include in its UE capability to the network an indication that it supports ERP. A bit could be added for this indication.

According to some embodiments of inventive concepts discussed in greater detail below, performance may be improved in terms of roundtrips, delay, and/or energy consumption.

Transport of an EAP-Finish/Re-auth message in NAS protocol in 5G is discussed below.

A problematic message in EAP and ERP may be the EAP-Finish/Re-auth message described in RFC 6696. This message may have overlapping functionality with the legacy NAS protocol message NAS Security Mode Command. If the EAP-Finish/Re-auth messages are carried transparently in NAS protocol, and NAS is not aware of it, then overlapping functionality may remain, and the fast re-authentication procedure may remain inefficient.

Figure 6B:
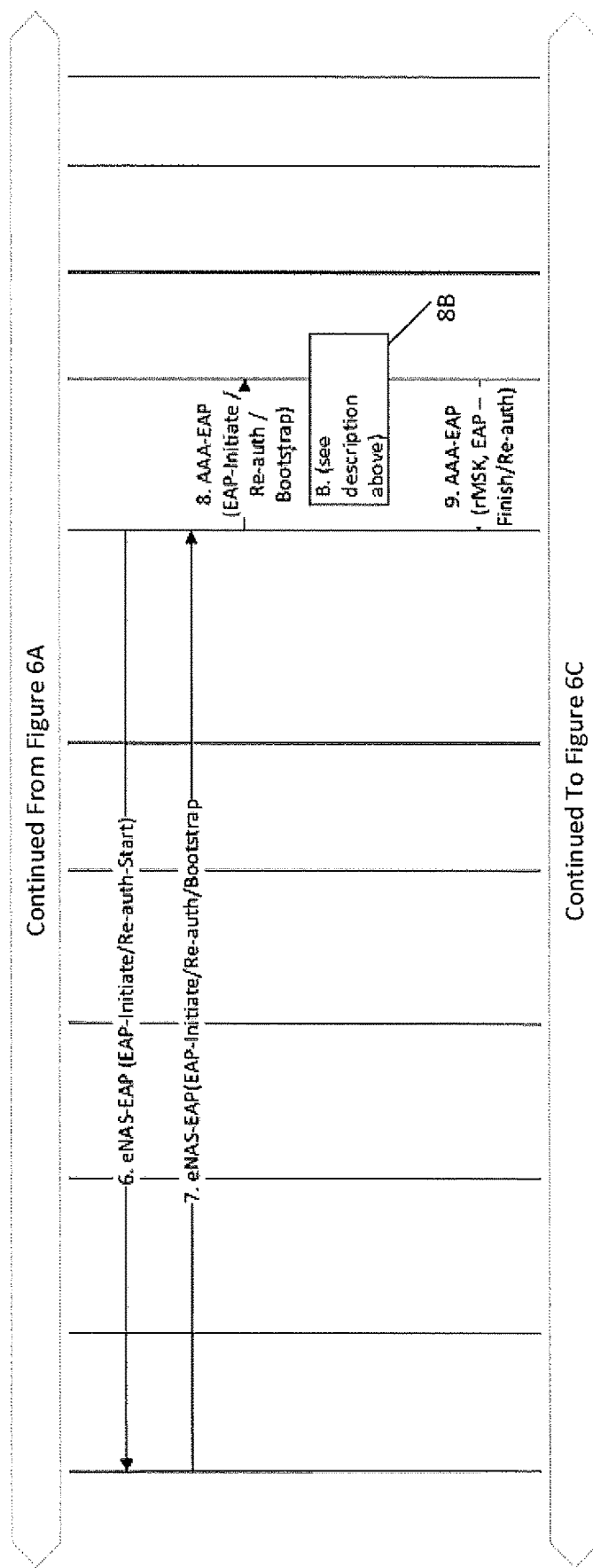
Figure 6C:
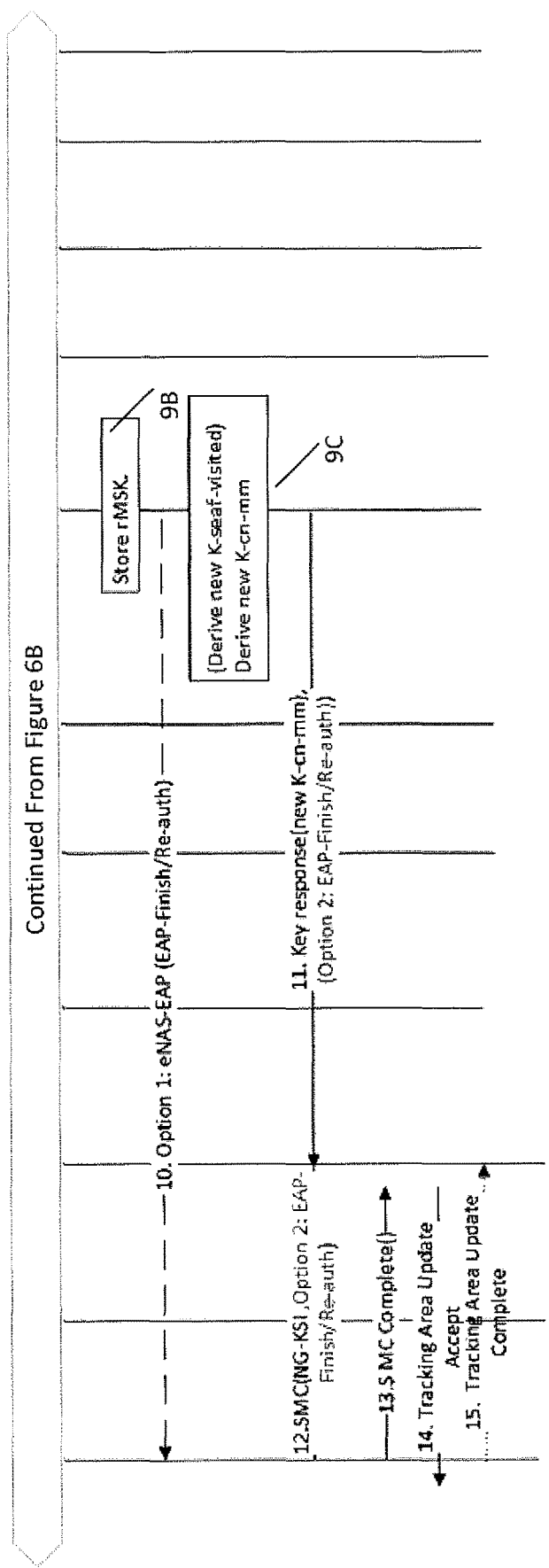

FIGS. 6A-C illustrate a signaling/message flow when ERP protocol is used for fast re-authentication where there are overlapping functionalities between NAS message and EAP message in operations 10, 11 and 12. According to some embodiments of inventive concepts, operation 10 of FIG. 6C may be omitted as indicated by the dashed line. Instead, the EAP-Finish/Re-auth message may be included in the key response of operation 11 and the SMC message of operation 12. In addition, the K-cn-mm authentication key may be included in the key response of operation 11, and the key identifier (NG-KSI) may be included in the SMC message of operation 12.

FIGS. 6A-C thus illustrate messages transmitted between a wireless terminal UE (NG UE) and various network nodes of a wireless communication network. As shown, messages between wireless terminal UE and the wireless communication network may flow through a radio access network (RAN) portions of the wireless communication network (including radio base stations, also referred to as eNBs, eNodeBs, etc.) to nodes of core network portions of the wireless communication network.

According to some embodiments, wireless terminal UE may transmit a tracking area update request message to a CN-MM network node of the new tracking area at operation, for example, in response to detecting entry into a new tracking area. In response to the tracking area update request message, the new CN-MM network node may transmit an information request message to the old CN-MM network node of the old tracking area at operation 2. After performing an integrity check of the tracking area update request message at operation 2B, the old CN-MM network node may transmit an information response message to the new CN-MM network node at operation 3, and the new CN-MM network node may transmit an information acknowledge message to the old CN-MM network node at operation 4.

At operation 5, new CN-MM network node may transmit a key request message to SEAF network node. Responsive to the key request message, SEAF network node may transmit an eNAS-EAP message including an EAP-initiate/Re-auth-Start message to wireless terminal UE at operation 6, and at operation 7, the wireless terminal UE may respond with an eNAS-EAP message including an EAP-initiate/Re-auth/Bootstrap message. At operation 8, SEAF network node may transmit an AAA-EAP message including the EAP-initiate/Re-auth/Bootstrap message to AUSF network node, where an rMSK authentication key may be derived at operation 8B as discussed with respect to FIGS. 7A and/or 7B.

At operation 9, AUSF network node may transmit an AAA-EAP message including the rMSK authentication key and an EAP-Finish/Re-auth message to the SEAF network, node. The SEAF network node may store the rMSK authentication key in memory at operation 9B and derive a new K-cn-mm authentication key based on the rMSK authentication key at operation 9C. Moreover, the SEAF network node may omit sending an eNAS-EAP message including an EAP-Finish/Re-auth message, and instead, the SEAF network node may send a key response message including the new k-cn-mm authentication key and including an EAP-Finish/Re-auth message at operation 11. More particularly, the key response message may be sent from the SEAF network node to the new CN-MM network node.

Responsive to the key response message, the new cn-mm network node may transmit a SMC message including a key identifier (NG-KSI) and including an EAP-Finish/Re-auth message through the radio access network to the wireless terminal UE at operation 12. The wireless terminal may reply at operation 13 with an SMC complete message at operation 13. The new cn-mm network node may then transmit a tracking area update accept message at block 14, and at block 15, the wireless terminal UE may transmit a tracking area update complete message.

While blocks of FIGS. 6A-C are discussed by way of example as being network nodes (which may be servers), operations/functionalities of such blocks may be combined and/or divided in ways other than those discussed above.

The ERP protocol may be transparent to NAS in all other messages, but the EAP-Finish/Re-auth message may be transported in the NAS Security Mode Command (SMC) message in operations 11 and 12. A new message in step 12 could in addition transfer the EAP-Finish/Re-auth message between SEAF or SCMF and CN-MM.

Figure 7A:
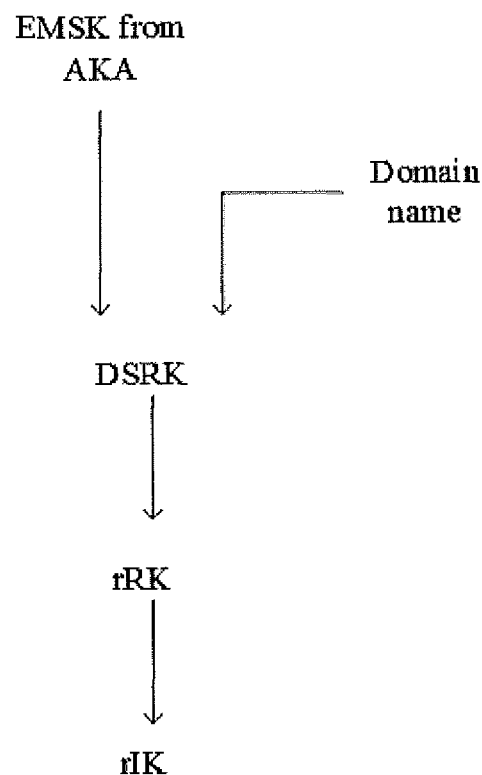
FIGS. 7A and 7B are diagrams illustrating authentication key derivations used according to some embodiments of inventive concepts.
Figure 7B:
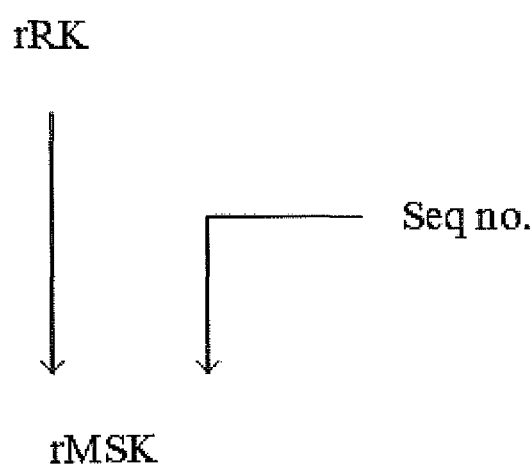

In ERP protocol, a freshness parameter (i.e., a sequence number may be used as input to derive a new rMSK authorization key from the EMSK when a fast re-authentication is initiated without triggering a full AKA-authentication) is shown in FIGS. 7A and 7B. As shown in FIG. 7A, authentication key derivations may be performed according to the ERP protocol by the AUSH network node after a full authentication has taken place using EAP-AKA or EAP-AKA'. As shown in FIG. 7B, fast re-authentication may be performed using the ERP protocol.

The freshness parameter (i.e., a sequence number or some other parameter providing a first freshness input to deriving a new rMSK) may need to be transferred to the UE. The rMSK authentication key could be mapped to K-SEAF key in the key hierarchy shown in FIG. 2.

A further authentication key may be derived from the K-SEAF in a network node containing either the AUSF function, the SEAF function, the SCMF or the CN-MM function, or some other function in 5G. Then a 'second freshness parameter', for example, a sequence number, a counter, a random number or some other parameter providing a second freshness input to derive a new CN-MM key from K-SEAF (e.g. rMSK or a key derived from rMSK or some other key), may need to be transferred to the UE as well. The new K-CN-MM key could, for example, be derived as follows:

New K-CN-MM key=KDF (rMSK, second freshness parameter, . . . ); or

New K-CN-MM key=KDF (a key derived from rMSK, second freshness parameter, . . . ); or New K-CN-MM key=KDF (K-SEAF key, second freshness parameter, . . . ).

This second freshness parameter should be included in NAS Security Mode Command message in 5G access.

When the wireless terminal UE receives the NAS Security Mode Command message, then it should:

1) derive a K-SEAF (e.g., rMSK) as described according to the ERP protocol using the first freshness parameter as input included either in the EAP-Finish/Re-auth message or the NAS Security Mode Command; and then 2) the UE shall derive a new K-CN-MM key from the K-SEAF key (e.g., rMSK, a key derived from rMSK, or some other key derived in step 1 above) using a second freshness parameter as input included in the NAS Security Mode Command message.

Figure 8B:
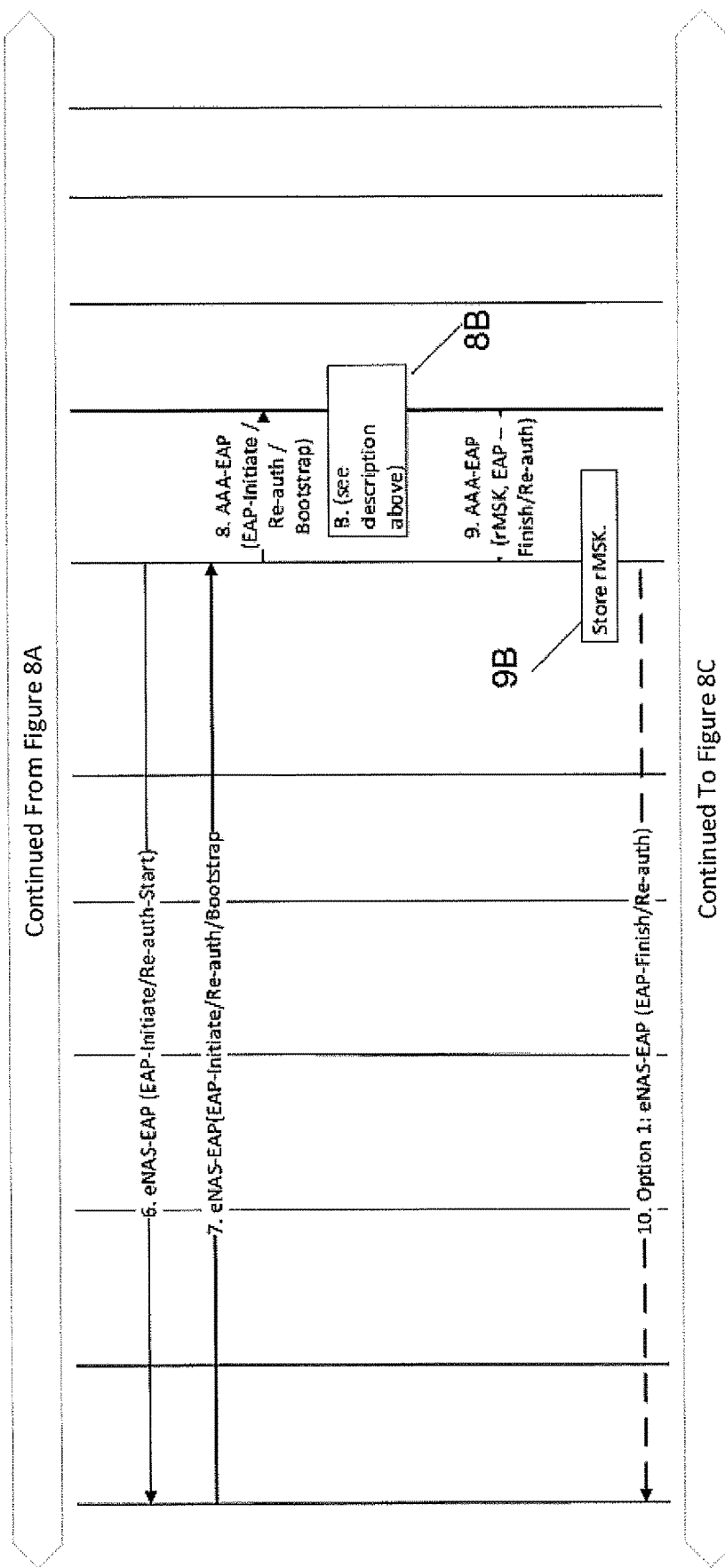

FIGS. 8A-B illustrate a message/signaling flow when ERP protocol is used for fast re-authentication where the second freshness parameter is included in a NAS Security Mode Command (SMC) message in operation 12 and also in operation 11 when transferred from the SEAF or SCMF to the CN-MM and UE. The inclusion of the second freshness parameter into the NAS Security Mode Command message is not dependent on whether ERP protocol is used or not. The use of ERP protocol is just one example how re-authentication can take place without running, for example, a full AKA procedure.

Figure 8C:
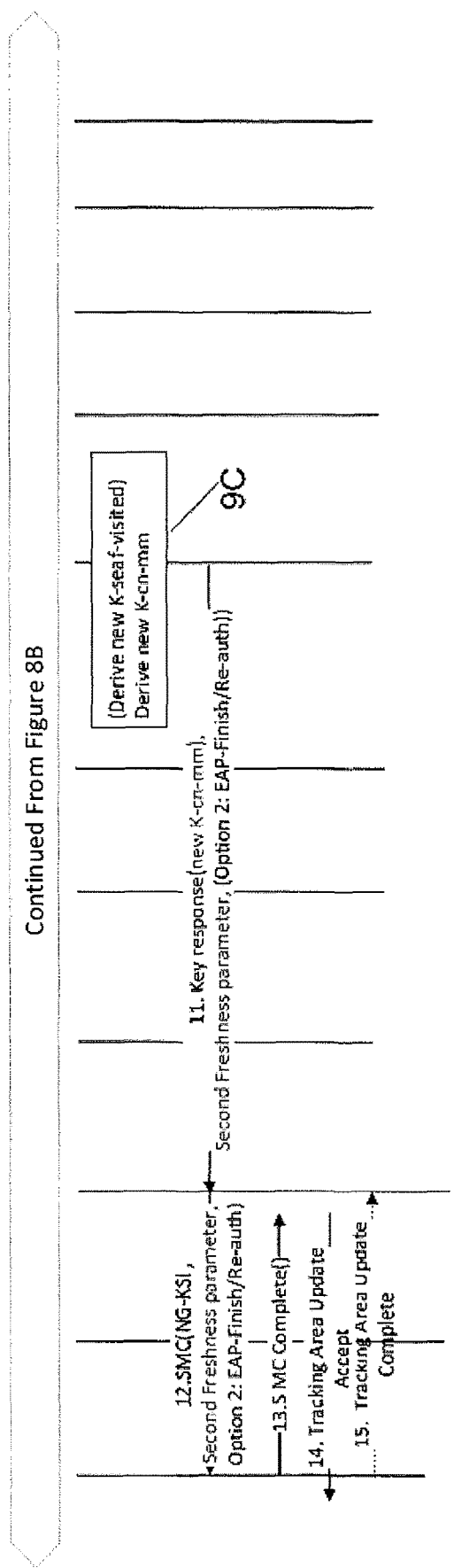

Note also that the second freshness parameter is not included in and is not part of the EAP-Finish/Re-auth message itself which is transported in the NAS Security Mode Command message in operation 12. FIGS. 8A-C illustrate re-authentication using ERP with a second freshness parameter included in the NAS Security Mode Command message. In particular, the operations of FIGS. 8A-C are the same as those discussed above with respect to FIGS. 6A-C, with the exception of operations 11 and 12. In FIG. 8C, the key response message of operation 11 includes the second freshness parameter in addition to the new K-cn-mm authentication key and the EAP-Finish/RE-auth message. In FIG. 8C, the SMC message of operation 12 includes the second freshness parameter in addition to the key identifier and the EAP-Finish/Re-auth message.

Support of ERP may be included in a capability indication from the UE to the network. To improve/optimize overlapping behavior between EAP-ERP protocol and NAS protocol, the wireless terminal UE could include in its UE capability an indication that it supports ERP to the network. A bit could be added for this indication and be included in UE originated NAS messages such as 5G NAS ATTACH REQUEST message, 5G NAS TRACKING AREA UPDATE REQUEST message (operation 1) or any other 5G NAS message sent in uplink from UE to network.

This indication of support of ERP could be replayed back from the network to the UE in an integrity protected message (e.g., SMC message of operation 12) so that the UE is able to check whether the bit used for indication of support of ERP has not been altered by an attacker on the air interface.

The UE capability indication for support of ERP could/should be forwarded to the SEAF network node and/or the SCMF network node.

Figure 9A:
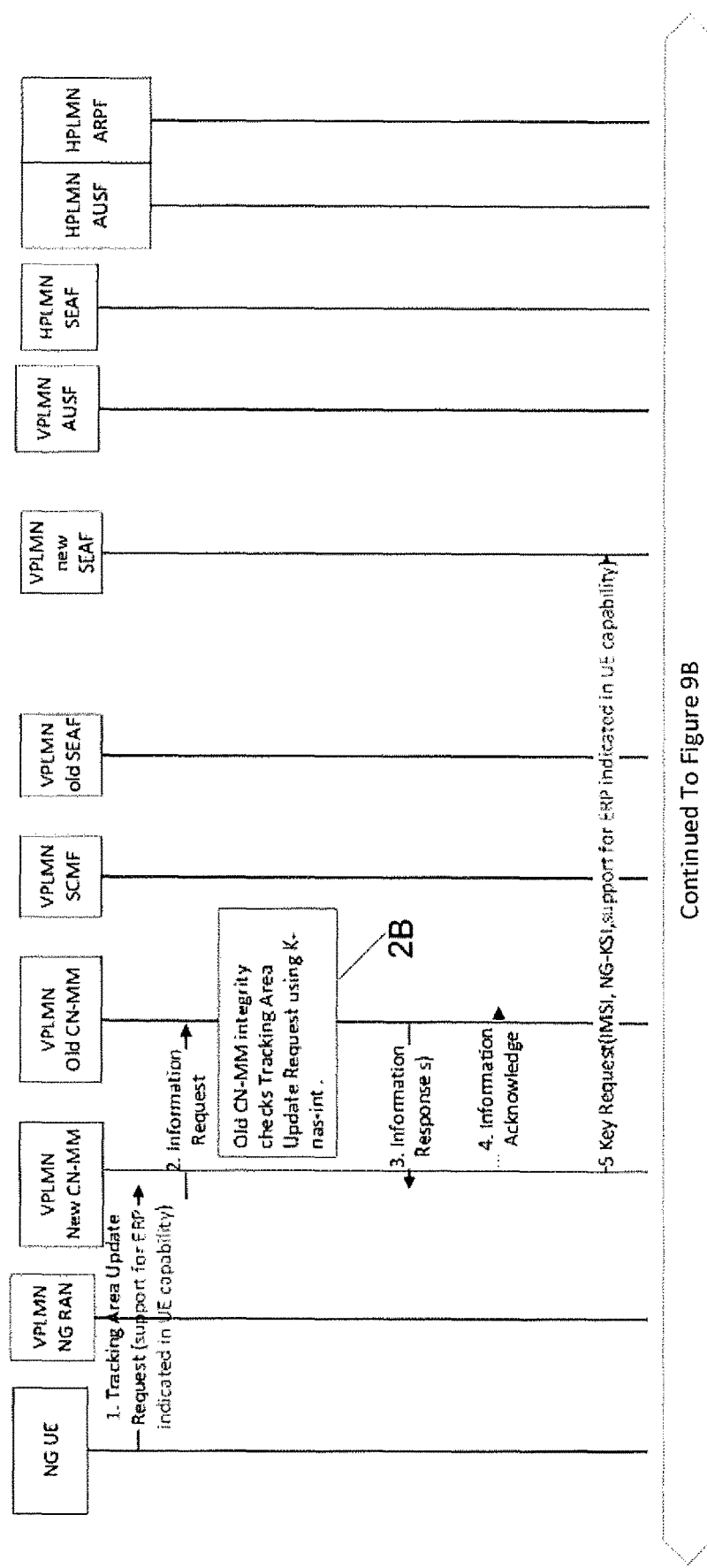

In operation 1 in FIG. 9A, the wireless terminal UE may include its UE capability indication for support of ERP in a 5G Attach Request or 5G Tracking Area Update Request message. A similar indication may also be included in the key request message of operation 5, and in the SMC message of operation 12. Accordingly, the CN-MM network node may forward the wireless terminal UE capability indication for support of ERP to the SEAF network node and/or SCMF network node in operation 5 in FIG. 9A. The CN-MM network node or the SCMF network node or the SEAF network node may reply with the UE capability indication for support of ERP to the UE in 5G NAS Security Mode Command in operation 12 in FIG. 9C. Other operations of FIGS. 9A-C may be the same as discussed above with respect to FIGS. 6A-C and/or FIGS. 8A-C.

As discussed above, NAS protocol and ERP may have overlapping functionality, but overlapping functionality between the two protocols may be reduced/removed according to some embodiments of inventive concepts.

In each of FIGS. 6, 8, and 9, operations may be initiated responsive to a tracking area update request message from the wireless terminal to the wireless communication network at operation 1. According to some other embodiments, operations may be initiated by another message, such as an attach request message from the wireless terminal UE.

Operations of an SEAF network node will now be discussed with reference to the flow chart of FIG. 12 and the modules of FIG. 13. For example, modules of FIG. 13 may be stored in network node memory 1007 of FIG. 10, and these modules may provide instructions so that when the instructions of a module are executed by processor 1003, processor 1003 performs respective operations of the flow chart of FIG. 12. As shown in FIG. 10, the network node may communicate using network interface 1005 with other nodes of the wireless communication network.

Figure 12:
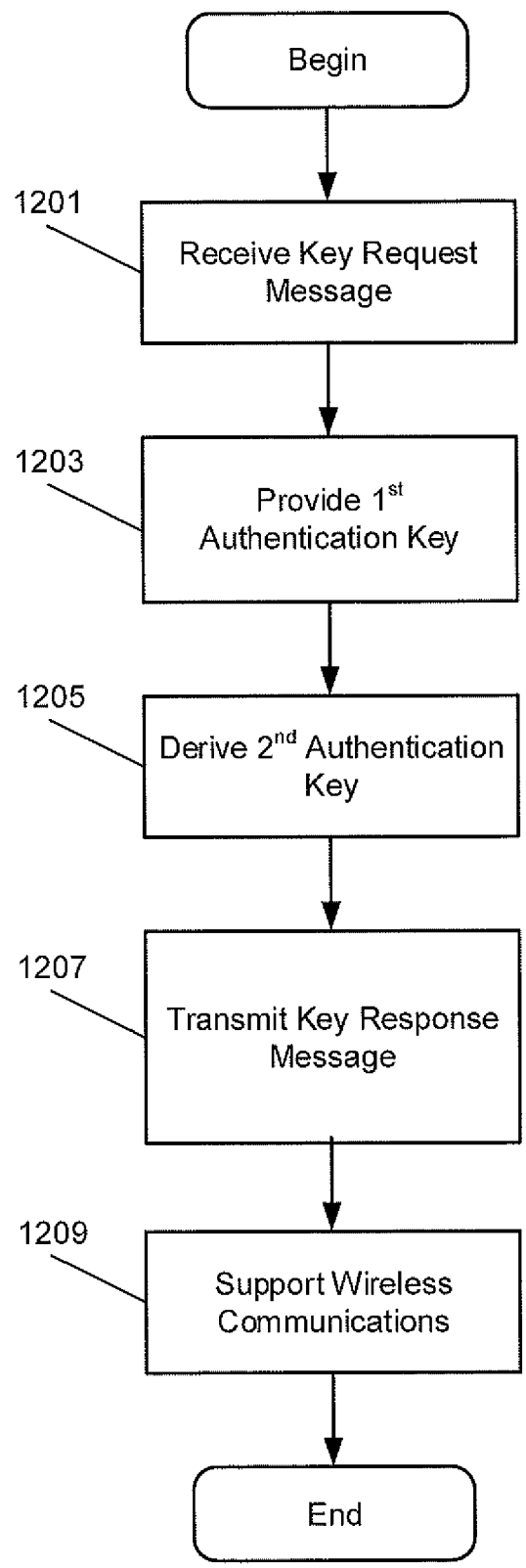
FIG. 12 is a flow chart illustrating operations of a network node of FIG. 10

The flow chart of FIG. 12 illustrates SEAF network node operations supporting communications with a wireless terminal UE. At block 1201, processor 1003 may receive a key request message through network interface 1005 as discussed above with respect to operation 5 (e.g., using key request reception module 1301). The key request message may include an indication that the wireless terminal supports an EAP Re-authentication Protocol (ERP). According to some embodiments, the key request message may be responsive to a tracking area update request message from the wireless terminal, and the tracking area update request message may include the indication that the wireless terminal supports the ERP. According to some other embodiments, the key request message may be responsive to an attach request message from the wireless terminal, and the attach request message may include the indication that the wireless terminal supports ERP.

At block 1203, processor 1003 may provide a first authentication key (e.g. an rMSK authentication key) as discussed above with reference to operation 9 (e.g., using $1^{st}$ authentication key provision module 1303), and the first authentication key may be provided responsive to the key request message. Providing the first authentication key may include receiving the first authentication key at a first node (e.g., an SEAF network node) of the wireless communication network from a second node (e.g., an AUSF network node) of the wireless communication network.

At block 1205, processor 1003 may derive a second authentication key (e.g., a new-K-cn-mm authentication key) based on the first authentication key as discussed above with respect to operation 9C (e.g., using $2^{nd}$ authentication key derivation module 1305), and the second authentication key may be associated with the wireless terminal.

At block 1207, processor 1003 may transmit a key response message including the second authentication key (new K-cn-mm) and/or an EAP-Finish/Re-auth message as discussed above with respect to operation 11 (e.g., using key response transmission module 1307) responsive to deriving the second authentication key. The key response message may include a freshness parameter used to derive the second authentication key, and the EAP-Finish/Re-auth message may be transmitted to the wireless terminal with the freshness parameter used to derive the second authentication key. Transmitting the key response message may include transmitting the key response message from the first node (e.g., an SEAF network node) to a third node (e.g., an NG RAN network node) of the wireless communication network.

The key response message may include the second authentication key (e.g., a new K-cn-mm authorization key) and an EAP-Finish/Re-auth message, the key response message may include the second authentication key (without the EAP-Finish/Re-auth message), or the key response message may include an EAP-Finish/Re-auth message (without the second authentication key).

According to some embodiments, an EAP-Finish/Re-auth message and/or an indication that the wireless terminal supports the ERP may be transmitted (from the cn-mm network node) to the wireless terminal responsive to the key response message. Moreover, the indication that the wireless terminal supports the ERP may be transmitted to the wireless terminal responsive to the key response message.

According to some embodiments, a Security Mode Command (SMC) message may be transmitted to the wireless terminal (from the CN-MM network node) responsive to the key response message, and the SMC message may include the EAP-Finish/Re-auth message that is transmitted to the wireless terminal responsive to the key response message. The SMC message may also include a key identifier (NG-KSI) associated with the second authentication key (new K-cn-mm authentication key). Moreover, the SMC message may be transmitted to the wireless terminal without the second authentication key (new K-cn-mm).

At block 1209, processor 1003 may support wireless communications for the wireless terminal using the wireless communication network and the cn-mm authentication key. Processor 1003, for example, may support transmission of wireless downlink communications (e.g., voice communications, data communications, text communications, etc.) and/or reception of wireless uplink communications (e.g., voice communications, data communications, text communications, etc.).

Figure 13:
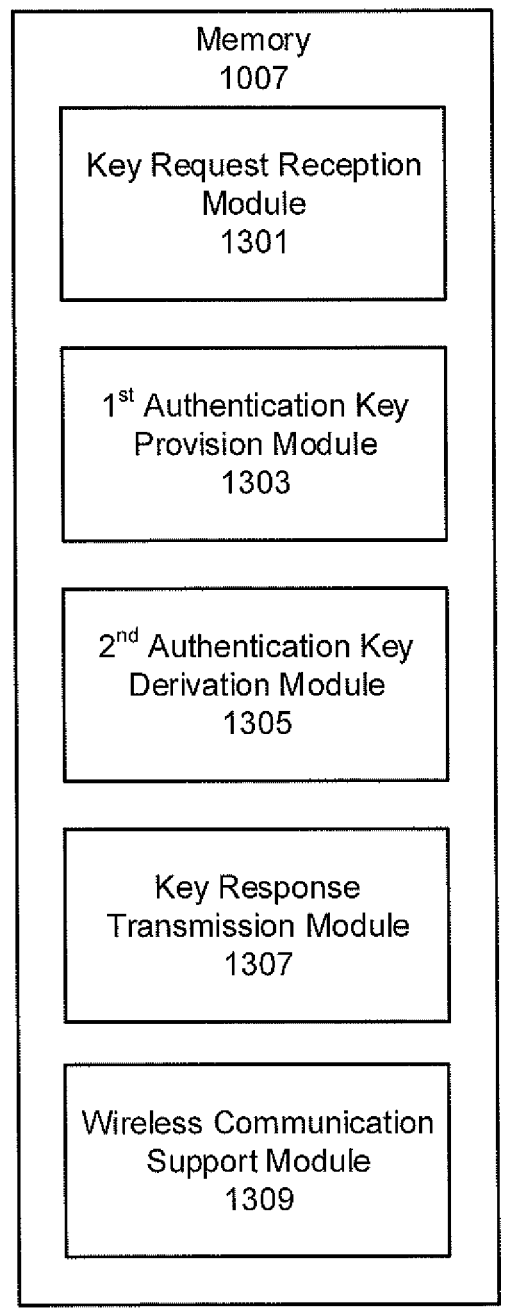
FIG. 13 is a block diagram illustrating related modules according to some embodiments of inventive concepts.

Various operations of FIG. 12 and/or modules of FIG. 13 may be optional with respect to some embodiments of network nodes and related methods. Regarding methods of example embodiment 1 (set forth below), for example, operations of blocks 1201 and 1209 of FIG. 12 may be optional, and modules 1301 and 1309 of FIG. 13 may be optional.

Operations of a CN-MM network node will now be discussed with reference to the flow chart of FIG. 14 and the modules of FIG. 15. For example, modules of FIG. 15 may be stored in network node memory 1007 of FIG. 10, and these modules may provide instructions so that when the instructions of a module are executed by processor 1003, processor 1003 performs respective operations of the flow chart of FIG. 14. As shown in FIG. 10, the network node may communicate using network interface 1005 with other nodes of the wireless communication network.

The flow chart of FIG. 14 illustrates CN-MM network node operations supporting communications with a wireless terminal UE. At block 1401, processor 1003 may receive an initiation message from the wireless terminal UE through network interface 1005 as discussed above with respect to operation 1 (e.g., using initiation message reception module 1501). The initiation message may be an attach request message or a tracking area update request message. Moreover, the initiation message may include an indication that the wireless terminal supports an EAP Re-authorization Protocol (ERP).

At block 1403, processor 1003 may transmit a key request message through network interface 1005 as discussed above with respect to operation 5 (e.g., using key request transmission module 1503) responsive to the initiation message. Moreover, each of the initiation message and the key request message may include an indication that the wireless terminal supports an EAP Re-authentication Protocol (ERP).

At block 1405, processor 1003 may receive a key response message including a core network mobility management authentication key (new K-cn-mm authentication key) and an EAP-Finish/Re-auth message as discussed above with respect to operation 11 (e.g., using key response reception module 1505). Moreover, the key response message may be responsive to the key request message of block 1403.

At block 1409, processor 1003 may initiate transmission (through network interface 1005) of an EAP-Finish/Re-auth message and/or a freshness parameter used to derive the core network mobility management authentication key from the wireless communication network to the wireless terminal as discussed above with respect to operation 12 (e.g., using transmission initiation module 1509), and transmission may be initiated responsive to receiving the key response message. Initiating transmission at block 1409 may further include initiating transmission of an indication that the wireless terminal supports the ERP to the wireless terminal responsive to the key response message.

Initiating transmission may include initiating transmission of a Security Mode Command (SMC) message from the wireless communication network to the wireless terminal responsive to the key response message. The SMC message may include the EAP-Finish/Re-auth message and/or the freshness parameter used to derive the core network mobility management authentication key that is transmitted to the wireless terminal responsive to the key response message. The SMC message may include a key identifier (NG-KSI) associated with the core network mobility management authentication key (new K-cn-mm authentication key). The SMC message may be transmitted to the wireless terminal without the core network mobility management authentication key (new K-cn-mm authentication code). At block 1409, for example, processor 1003 may transmit the SMC message through network interface 1005 and through at least one NG RAN node (e.g., a base station) to wireless terminal UE.

The core network mobility management authentication key may be derived based on an rMSK authentication key.

Initiating transmission may include initiating transmission of the EAP-Finish/Re-auth message and/or the freshness parameter used to derive the core network mobility management authentication key from the wireless communication network to the wireless terminal responsive to receiving the key response message (e.g., as elements of the SMC message).

For example, initiating transmission may include initiating transmission of the freshness parameter used to derive the core network mobility management authentication key from the wireless communication network to the wireless terminal responsive to receiving the key response message, and the key response message may include the freshness parameter used to derive the core network mobility management authentication key.

Initiating transmission may include initiating transmission of the EAP-Finish/Re-auth message from the wireless communication network to the wireless terminal responsive to receiving the key response message.

Receiving the key response message at block 1405 may include receiving the key response message at a first node (e.g., a new CN-MM network node) from a second node (e.g., an SEAF network node), and initiating transmission at block 1409 may include initiating transmission of the EAP-Finish/Re-auth message and/or a freshness parameter used to derive the core network mobility management authentication key from the first node to the wireless terminal.

At block 1411, processor 1003 may support wireless communications for the wireless terminal using the wireless communication network and the core network mobility management authentication key. Processor 1003, for example, may support transmission of wireless downlink communications (e.g., voice communications, data communications, text communications, etc.) and/or reception of wireless uplink communications (e.g., voice communications, data communications, text communications, etc.).

Various operations of FIG. 14 and/or modules of FIG. 15 may be optional with respect to some embodiments of network nodes and related methods. Regarding methods of example embodiment 21 (set forth below), for example, operations of blocks 1401, 1403, and 1411 of FIG. 14 may be optional, and modules 1501, 1503, and 1511 of FIG. 15 may be optional.

Operations of a wireless terminal UE will now be discussed with reference to the flow chart of FIG. 16 and the modules of FIG. 17 according to some other embodiments. For example, modules of FIG. 17 may be stored in wireless terminal memory 1107 of FIG. 11, and these modules may provide instructions so that when the instructions of a module are executed by wireless terminal processor 1103, processor 1103 performs respective operations of the flow chart of FIG. 16. As shown in FIG. 11, wireless terminal UE may communicate using transceiver 1101 over a wireless interface with a wireless communication network. While not shown in FIG. 11 for sake of conciseness, wireless terminal UE may also include a user interface coupled with processor 1103 to accept user input (e.g., a keypad, a touch sensitive display, a pointer device, etc.) and to provide user output (e.g., a display, a speaker, etc.).

Figure 16:
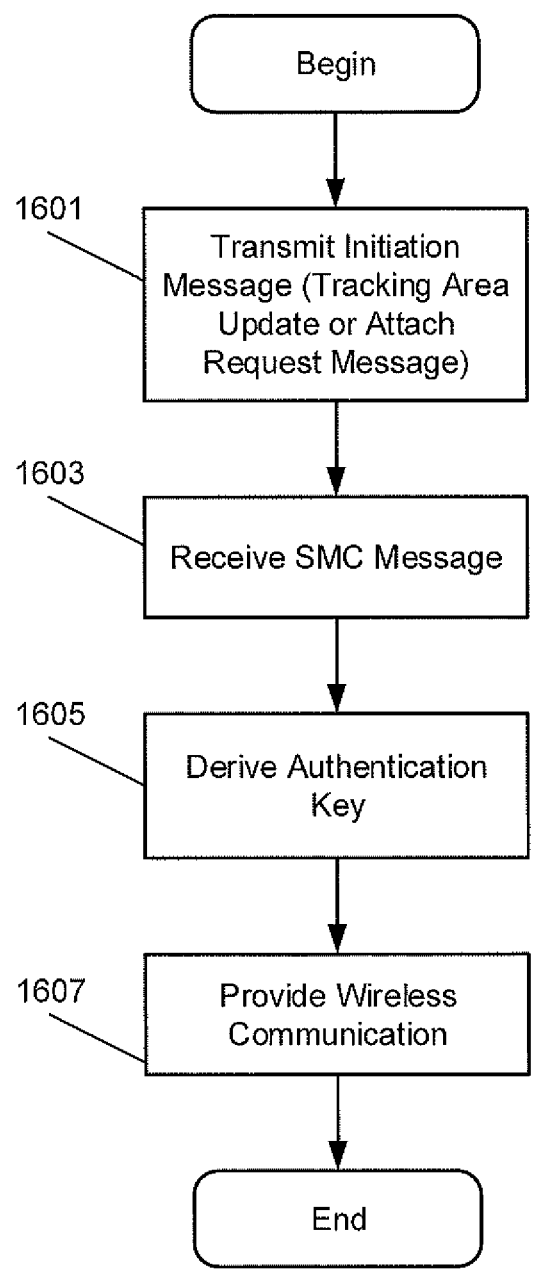
FIG. 16 is a flow chart illustrating operations of a wireless terminal of FIG. 11

The flow chart of FIG. 16 illustrates wireless terminal UE operations providing communications with the wireless communication network. At block 1601, processor 1103 may transmit an initiation message through transceiver 1101 to wireless communication network as discussed above with respect to operation 1 (e.g., using initiation message transmission module 1701). The initiation message, for example, may be a tracking area update request message or an attach request message.

At block 1603, processor 1103 may receive a Security Mode Command (SMC) message from the wireless communication network as discussed above with respect to operation 12 (e.g., using SMC message reception module 1703), and the SMC message may include an EAP-Finish/Re-auth message and/or a freshness parameter used to derive a core network mobility management authentication key. The SMC message may be responsive to the initiation message. Moreover, the SMC message and the initiation message may include an indication that the wireless terminal supports an EAP Re-authentication Protocol (ERP).

The SMC message may include a key identifier (NG-KSI) associated with a core network mobility management authentication key (new K-cn-mm authentication key). The SMC message may be received without a core network mobility management authentication key (new K-cn-mm authentication key), and/or the core network mobility management key may be derived based on an rMSK authentication key. The SMC message may include a freshness parameter used to derive the core network mobility management parameter, and/or the SMC message may include an EAP-Finish/Re-auth message.

At block 1605, processor 1103 may derive a core network mobility management authentication key based on information in the SMC message (e.g., using authentication key derivation module 1705). At block 1607, processor 1103 may provide wireless communications through the wireless communication network using the core network mobility management authentication key (e.g., using wireless communication provision module 1707). Processor 1103, for example, may support transmission of wireless uplink communications (e.g., voice communications, data communications, text communications, etc.) through transceiver 1101 and/or reception of wireless downlink communications (e.g., voice communications, data communications, text communications, etc.) through transceiver 1101.

Figure 17:
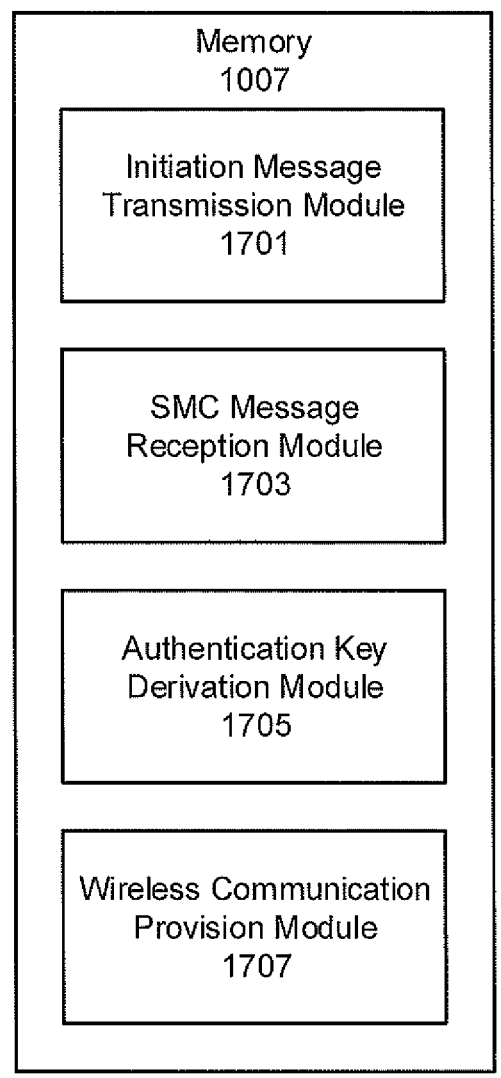
FIG. 17 is a block diagram illustrating related modules according to some embodiments of inventive concepts.

Various operations of FIG. 16 and/or modules of FIG. 17 may be optional with respect to some embodiments of wireless terminals and related methods. Regarding methods of example embodiment 42 (set forth below), for example, operations of blocks 1601, 1605, and 1607 of FIG. 16 may be optional, and modules 1701, 1705, and 1707 of FIG. 17 may be optional.

Example Embodiments

1. A method in a wireless communication network supporting communications with a wireless terminal, the method comprising: providing (1203) a first authentication key (rMSK); deriving (1205) a second authentication key (new-K-cn-mm) based on the first authentication key, wherein the second authentication key is associated with the wireless terminal; and responsive to deriving the second authentication key, transmitting (1207) a key response message including the second authentication key (new K-cn-mm) and/or an EAP-Finish/Re-auth message.

2. The method of Embodiment 1, wherein an EAP-Finish/Re-auth message is transmitted from the wireless communication network to the wireless terminal responsive to the key response message.

3. The method of Embodiment 2 wherein a Security Mode Command, SMC, message is transmitted to the wireless terminal responsive to the key response message, wherein the SMC message includes the EAP-Finish/Re-auth message that is transmitted to the wireless terminal responsive to the key response message.

4. The method of Embodiment 3, wherein the SMC message includes a key identifier (NG-KSI) associated with the second authentication key (new K-cn-mm).

5. The method of any of Embodiments 3-4, wherein the SMC message is transmitted to the wireless terminal without the second authentication key (new K-cn-mm).

6. The method of any of Embodiments 1-5, wherein the key response message includes a freshness parameter used to derive the second authentication key.

7. The method of Embodiment 6 wherein the EAP-Finish/Re-auth message is transmitted to the wireless terminal with the freshness parameter used to derive the second authentication key.

8. The method of any of Embodiments 1-7 further comprising: receiving (1201) a key request message, wherein the first authentication key is provided responsive to the key request message.

9. The method of Embodiment 8 wherein the key request message includes an indication that the wireless terminal supports an EAP Re-authentication Protocol (ERP).

10. The method of Embodiment 9 wherein the key request message is responsive to a tracking area update request message from the wireless terminal, wherein the tracking area update request message includes the indication that the wireless terminal supports the ERP.

11. The method of Embodiment 9 wherein the key request message is responsive to an attach request message from the wireless terminal, wherein the attach request message includes the indication that the wireless terminal supports ERP.

12. The method of any of Embodiments 9-11 wherein an EAP-Finish/Re-auth message and the indication that the wireless terminal supports the ERP are transmitted to the wireless terminal responsive to the key response message.

13. The method of any of Embodiments 9-11 wherein the EAP-Finish/Re-auth message is transmitted to the wireless terminal responsive to the key response message.

14. The method of any of Embodiments 9-11 wherein the indication that the wireless terminal supports the ERP is transmitted to the wireless terminal responsive to the key response message.

15. The method of any of Embodiments 1-14, wherein providing the first authentication key comprises receiving the first authentication key at a first node (SEAF) of the wireless communication network from a second node (AUSF) of the wireless communication network, and wherein transmitting the key response message comprises transmitting the key response message from the first node (SEAF) to a third node (NG RAN) of the wireless communication network.

16. The method of any of Embodiments 1-15 wherein the first authentication key comprises an rMSK key.

17. The method of any of Embodiments 1-16 wherein the second authentication key comprises a core network mobility management key (new K-cn-mm).

18. The method of any of Embodiments 1-17 wherein the key response message includes the second authentication key (new K-cn-mm) and an EAP-Finish/Re-auth message.

19. The method of any of Embodiments 1-17 wherein the key response message includes the second authentication key (new K-cn-mm).

20. The method of any of Embodiments 1-17 wherein the key response message includes an EAP-Finish/Re-auth message.

21. A method in a wireless communication network supporting communications with a wireless terminal, the method comprising: receiving (1405) a key response message including a core network mobility management authentication key (new K-cn-mm) and an EAP-Finish/Re-auth message; and responsive to receiving the key response message, initiating (1409) transmission of an EAP-Finish/Re-auth message and/or a freshness parameter used to derive the core network mobility management authentication key from the wireless communication network to the wireless terminal responsive to the key response message.

22. The method of Embodiment 21, wherein initiating transmission comprises initiating transmission of a Security Mode Command, SMC, message from the wireless communication network to the wireless terminal responsive to the key response message, wherein the SMC message includes the EAP-Finish/Re-auth message and/or a freshness parameter used to derive the core network mobility management authentication key that is transmitted to the wireless terminal responsive to the key response message.

23. The method of Embodiment 22, wherein the SMC message includes a key identifier (NG-KSI) associated with the core network mobility management authentication key authentication key (new K-cn-mm).

24. The method of any of Embodiments 22-23, wherein the SMC message is transmitted to the wireless terminal without the core network mobility management authentication key (new K-cn-mm).

25. The method of any of Embodiments 21-24, wherein the core network mobility management key is derived based on an rMSK key.

26. The method of Embodiment 21-25 wherein initiating transmission comprises initiating transmission of the EAP-Finish/Re-auth message and the freshness parameter used to derive the core network mobility management authentication key from the wireless communication network to the wireless terminal responsive to receiving the key response message.

27. The method of Embodiment 21-25 wherein initiating transmission comprises initiating transmission of the freshness parameter used to derive the core network mobility management authentication key from the wireless communication network to the wireless terminal responsive to receiving the key response message.

28. The method of any of Embodiments 26-27, wherein the key response message includes the freshness parameter used to derive the core network mobility management authentication key.

29. The method of Embodiment 21-25 wherein initiating transmission comprises initiating transmission of the EAP-Finish/Re-auth message from the wireless communication network to the wireless terminal responsive to receiving the key response message.

30. The method of any of Embodiments 21-29 further comprising:

transmitting (1403) a key request message, wherein the key response message is responsive to the key request message.

31. The method of Embodiment 30 wherein further comprising: receiving (1401) a tracking area update request message from the wireless terminal, wherein transmitting the key request message comprises transmitting the key request message responsive to receiving the tracking area update request message.

32. The method of Embodiment 31 wherein each of the tracking area update request message and the key request message includes an indication that the wireless terminal supports an EAP Re-authentication Protocol (ERP).

33. The method of Embodiment 32 wherein initiating transmission comprises initiating transmission of the indication that the wireless terminal supports the ERP to the wireless terminal responsive to the key response message.

34. The method of Embodiment 30 wherein further comprising: receiving (1401) an attach request message from the wireless terminal, wherein transmitting the key request message comprises transmitting the key request message responsive to receiving the attach request message.

35. The method of Embodiment 34 wherein each of the attach request message and the key request message includes an indication that the wireless terminal supports an EAP Re-authentication Protocol (ERP).

36. The method of Embodiment 35 wherein initiating transmission comprises initiating transmission of the indication that the wireless terminal supports the ERP to the wireless terminal responsive to the key response message.

37. The method of any of Embodiments 21-36, wherein receiving the key response message comprises receiving the key response message at a first node (New CN-MM) from a second node (SEAF), and wherein initiating transmission comprises initiating transmission of the EAP-Finish/Re-auth message and/or a freshness parameter used to derive the core network mobility management authentication key from the first node to the wireless terminal.

38. The method of any of Embodiments 1-37 further comprising: supporting (1209, 1411) wireless communications for the wireless terminal using the wireless communication network and the core network mobility management authentication key.

39. A node of a wireless communication network, wherein the node is adapted to perform according to any of Embodiments 1-38.

40. A node of a wireless communication network, the node comprising: a network interface (1005) adapted to provide communication with other nodes of the wireless communication network; and a processor (1003) coupled to the network interface, wherein the processor is configured to perform operations according to any of Embodiments 1-27, wherein the processor is configured to transmit and/or receive communications through the network interface.

41. A node of a wireless communication network, the node comprising modules adapted to perform according to any of Embodiments 1-38.

42. A method of operating a wireless terminal configured to provide communication using a wireless communication network, the method comprising: receiving (1603) a Security Mode Command, SMC, message from the wireless communication network, wherein the SMC message includes an EAP-Finish/Re-auth message and/or a freshness parameter used to derive a core network mobility management authentication key.

43. The method of Embodiment 42, wherein the SMC message includes a key identifier (NG-KSI) associated with a core network mobility management authentication key (new K-cn-mm).

44. The method of any of Embodiments 42-43, wherein the SMC message is received without a core network mobility management authentication key (new K-cn-mm).

45. The method of any of Embodiments 43-44, wherein the core network mobility management key is derived based on an rMSK key.

46. The method of any of Embodiments 42-45, wherein the SMC message includes a freshness parameter used to derive the core network mobility management parameter.

47. The method of any of Embodiments 42-46, wherein the SMC message includes an EAP-Finish/Re-auth message.

48. The method of any of Embodiments 42-47, further comprising:

deriving (1605) a core network mobility management authentication key based on information in the SMC message.

49. The method of Embodiment 48 further comprising: providing (1607) wireless communications through the wireless communication network using the core network mobility management authentication key.

50. The method of any of Embodiments 42-49, further comprising: transmitting (1601) a tracking area update request message to the wireless communication network, wherein the SMC message is responsive to the tracking area update request message.

51. The method of Embodiment 50, wherein each of the tracking area update request message and the SMC message includes an indication that the wireless terminal supports an EAP Re-authentication Protocol (ERP).

52. The method of any of Embodiments 42-49 further comprising: transmitting (1601) an attach request message to the wireless communication network, wherein the SMC message is responsive to the attach request message.

53. The method of Embodiment 52, wherein each of the attach request message and the SMC message includes an indication that the wireless terminal supports an EAP Re-authentication Protocol (ERP).

54. A wireless terminal (UE) configured to provide communication using a wireless communication network, wherein the wireless terminal is adapted to perform according to any of Embodiments 42-53.

55. A wireless terminal (UE) configured to provide communication using a wireless communication network, the wireless terminal comprising: a wireless communication interface (1101) adapted to provide communication over a radio interface with the wireless communication network; and a processor (1103) coupled to the wireless communication interface, wherein the processor is configured to perform operations according to any of Embodiments 42-53, wherein the processor is configured to transmit and/or receive communications through the wireless communication interface.

56. A wireless terminal configured to provide communication using a wireless communication network, the wireless terminal comprising modules adapted to perform according to any of Embodiments 42-53.

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

Explanations for abbreviations used herein are provided below.

ARPF Authentication Credential Repository and Processing Function
AUSF Authentication Server Function
SEAF Security Anchor Function
EAP Extensible Authentication Protocol
ERP EAP re-authentication protocol
CN-MM Core Network-Mobility Management
SCMF Security Context Management Function References mentioned herein are identified below.

[1] 3GPP TR 23.799 Technical Specification Group Services and System Aspects; Study on Architecture for Next Generation System (Release 14) version 0.8.0;

[2] 3GPP TR 33.899 Technical Specification Group Services and System Aspects; Study on the security aspects of the next generation system (Release 14) version 0.8.0;

[3] 3GPP TR 33.821 Technical Specification Group Services and System Aspects; Rationale and track of security decisions in Long Term Evolved (LTE) RAN/3GPP System Architecture Evolution (SAE) (Release 9);

[4] RFC 6696, Z. Cao, et al., EAP Extensions for the EAP Re-authentication Protocol (ERP), July 2012.

The invention claimed is:

1. A method of operating a user equipment (UE) configured to provide communication using a wireless communication network, the method comprising:
   the UE transmitting via a base station to a first core network node a request message;
   after transmitting the request message to the first core network node via the base station, the UE receiving via the base station an Extensible Authentication Protocol (EAP) Re-authentication Protocol (ERP) trigger message transmitted by a second core network node that is distinct from the first core network node, the ERP trigger message for triggering an ERP exchange;
   in response to receiving the ERP trigger message for triggering the ERP exchange, transmitting an ERP initiation message to initiate the ERP exchange; and
   after transmitting the initiation message, receiving a Security Mode Command (SMC) message transmitted by the first core network node, wherein the SMC message includes an ERP finish message that terminates the ERP exchange.

2. The method of claim 1, wherein the SMC message further includes a key identifier associated with a core network mobility management authentication key.

3. The method of claim 1, wherein the SMC message further includes a freshness parameter.

4. The method of claim 1, wherein the request message includes an indication that the UE supports ERP.

5. The method of claim 1, further comprising:
   deriving a core network mobility management authentication key based on information in the SMC message.

6. The method of claim 5 further comprising:
   providing wireless communications through the wireless communication network using the core network mobility management authentication key.

7. The method of claim 1, wherein the request message is a Non-Access Stratum (NAS) request message.

8. The method of claim 7, wherein
   the NAS message is a NAS message indicating that the UE has moved into a new tracking area, or
   the NAS message is an attach request message.

9. The method of claim 1, further comprising:
   after receiving the SMC message, the UE transmitting to the first core network node an SMC response message responsive to the SMC message; and
   after transmitting the SMC response message, the UE receiving an accept message transmitted by the first core network node, wherein the accept message indicates that the first core network node has accepted the request message.

10. The method of claim 1, wherein
    the first core network node comprises a mobility management function,
    the request message is Tracking Area Update (TAU) request message indicating that the UE has moved from a first Tracking Area to a second Tracking Area,
    the TAU request message is for the mobility management function,
    the method further comprises, prior to the UE transmitting the TAU request message for the mobility management function, the UE receiving from the base station a connection setup message for establishing a connection with the UE, and
    the step of transmitting the TAU request message to the first core network node comprises transmitting to the base station a connection setup acknowledgement message acknowledging the connection setup message, wherein the connection setup acknowledgement message comprises the TAU request message.

11. The method of claim 10, wherein
    the SMC message is transmitted to the UE by the mobility management function, and
    the second core network node is a security anchor function (SEAF).

12. A user equipment (UE), the UE comprising:
    a wireless communication interface adapted to provide communication over a radio interface with a wireless communication network; and
    a processor coupled to the wireless communication interface, wherein the processor is configured to transmit and/or receive communications through the wireless communication interface, and wherein the UE is configured to perform a process comprising:
    transmitting via a base station to a first core network node a request message;
    after transmitting the request message to the first core network node via the base station, receiving via the base station an Extensible Authentication Protocol (EAP) Re-authentication Protocol (ERP) trigger message transmitted by a second core network node that is distinct from the first core network node, the ERP trigger message for triggering an ERP exchange;
    in response to receiving the ERP trigger message for triggering the ERP exchange, transmitting an ERP initiation message to initiate the ERP exchange; and
    after transmitting the initiation message, receiving a Security Mode Command (SMC) message transmitted by the first core network node, wherein the SMC message includes an ERP finish message that terminates the ERP exchange.

* * * * *